(12) United States Patent
Sato

(10) Patent No.: US 12,551,193 B2
(45) Date of Patent: Feb. 17, 2026

(54) ULTRASOUND DIAGNOSIS APPARATUS

(71) Applicant: CANON MEDICAL SYSTEMS CORPORATION, Tochigi (JP)

(72) Inventor: Takeshi Sato, Nasushiobara (JP)

(73) Assignee: CANON MEDICAL SYSTEMS CORPORATION, Tochigi (JP)

( * ) Notice: Subject to any disclaimer, the term of this patent is extended or adjusted under 35 U.S.C. 154(b) by 42 days.

(21) Appl. No.: 18/164,920

(22) Filed: Feb. 6, 2023

(65) Prior Publication Data

US 2023/0248336 A1    Aug. 10, 2023

(30) Foreign Application Priority Data

Feb. 7, 2022 (JP) .................................. 2022-017044

(51) Int. Cl.
A61B 8/00     (2006.01)

(52) U.S. Cl.
CPC .......... *A61B 8/5207* (2013.01); *A61B 8/4477* (2013.01)

(58) Field of Classification Search
CPC ............. G01S 15/8925; G01S 15/8927; A61B 8/4488
See application file for complete search history.

(56) References Cited

U.S. PATENT DOCUMENTS

| | | | | |
|---|---|---|---|---|
| 5,797,845 | A * | 8/1998 | Barabash | A61B 8/4281 600/443 |
| 5,901,708 | A * | 5/1999 | Chang | G01S 15/8925 600/443 |

(Continued)

FOREIGN PATENT DOCUMENTS

| | | |
|---|---|---|
| JP | 2017-086156 A | 5/2017 |
| JP | 2022-505511 A | 1/2022 |

OTHER PUBLICATIONS

Bouzari et al., "Improved Focusing Method for 3-D Imaging using Row-Column-Addressed 2-D Arrays", in Proc. IEEE Ultrasonics Symp., 2017, 4 pages.

(Continued)

*Primary Examiner* — Oommen Jacob
(74) *Attorney, Agent, or Firm* — Oblon, McClelland, Maier & Neustadt, L.L.P.

(57) ABSTRACT

An ultrasound diagnosis apparatus according to an embodiment includes an ultrasound probe including a plurality of transducer elements arranged two-dimensionally. The plurality of transducer elements are a plurality of Row-Column Addressing transducer elements configured so that: when a first ultrasound wave is to be transmitted, the first ultrasound wave is caused to be transmitted from a first transducer element group including a plurality of transducer elements that are arranged in a direction along one axe and are connected in common to one another; when a reflected wave of the first ultrasound wave is to be received, the reflected wave of the first ultrasound wave is caused to be received by a second transducer element group including a plurality of transducer elements that are arranged in a direction along the other axe and are connected in common to one another; when a second ultrasound wave is to be transmitted, the second ultrasound wave is caused to be transmitted from the second transducer element group; and when a reflected wave of the second ultrasound wave is to be received, the reflected wave of the second ultrasound wave is caused to be received by the first transducer element group.

2 Claims, 17 Drawing Sheets

(56) References Cited

U.S. PATENT DOCUMENTS

| | | | |
|---|---|---|---|
| 6,352,510 B1* | 3/2002 | Barabash | G01S 15/8925 |
| | | | 600/443 |
| 6,537,220 B1* | 3/2003 | Friemel | G01S 15/8927 |
| | | | 600/447 |
| 6,582,367 B1* | 6/2003 | Robinson | A61B 8/483 |
| | | | 600/443 |
| RE40,456 E * | 8/2008 | Bates | G10K 11/341 |
| | | | 367/105 |
| 9,855,022 B2 | 1/2018 | Christiansen et al. | |
| 10,608,753 B2* | 3/2020 | Matsuda | G01N 29/262 |
| 10,859,696 B2* | 12/2020 | Bouzari | G10K 11/30 |
| 2005/0033165 A1* | 2/2005 | Ustuner | A61B 8/5269 |
| | | | 600/443 |
| 2015/0087991 A1 | 3/2015 | Chen et al. | |
| 2016/0206285 A1* | 7/2016 | Christiansen | A61B 8/483 |
| 2017/0003384 A1* | 1/2017 | Christiansen | G01S 15/8915 |
| 2017/0250468 A1* | 8/2017 | Cherubini | H04B 7/086 |
| 2018/0348624 A1* | 12/2018 | Jensen | G10K 11/346 |
| 2020/0064468 A1 | 2/2020 | Holbek et al. | |
| 2021/0132223 A1* | 5/2021 | Hennersperger | G01S 7/52049 |
| 2022/0096054 A1* | 3/2022 | Vignon | A61B 8/5207 |
| 2023/0248336 A1* | 8/2023 | Sato | G01S 15/8925 |
| | | | 600/443 |

OTHER PUBLICATIONS

Office Action issued Nov. 5, 2025, in corresponding Japanese Patent Application No. 2022-017044, 3 pages.

* cited by examiner

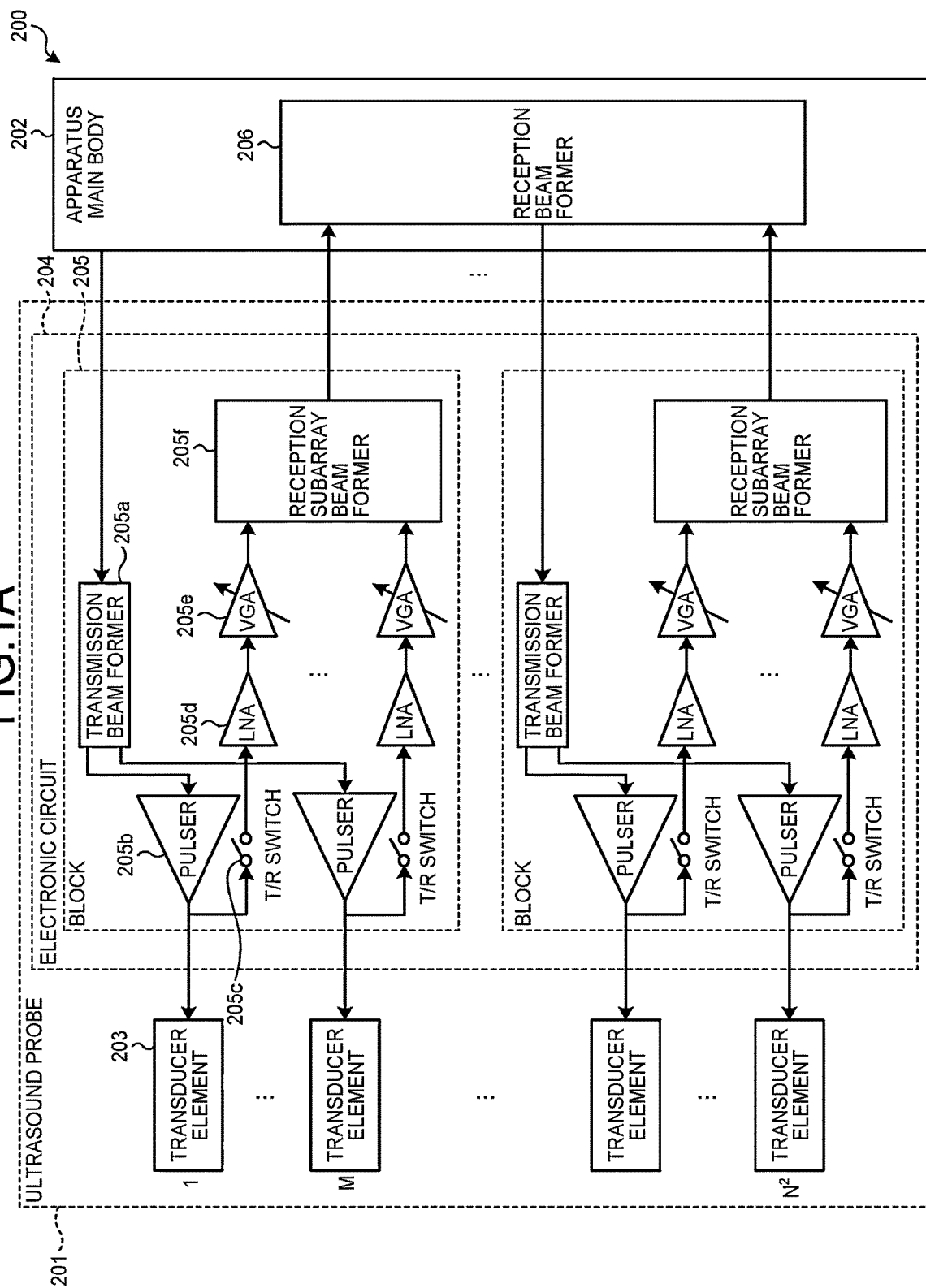

QUANTITY OF ELECTRONIC CIRCUITS: $N^2$

NO Tx/Rx APODIZATION

NO Tx/Rx APODIZATION

Tx/Rx HANNING APODIZATION

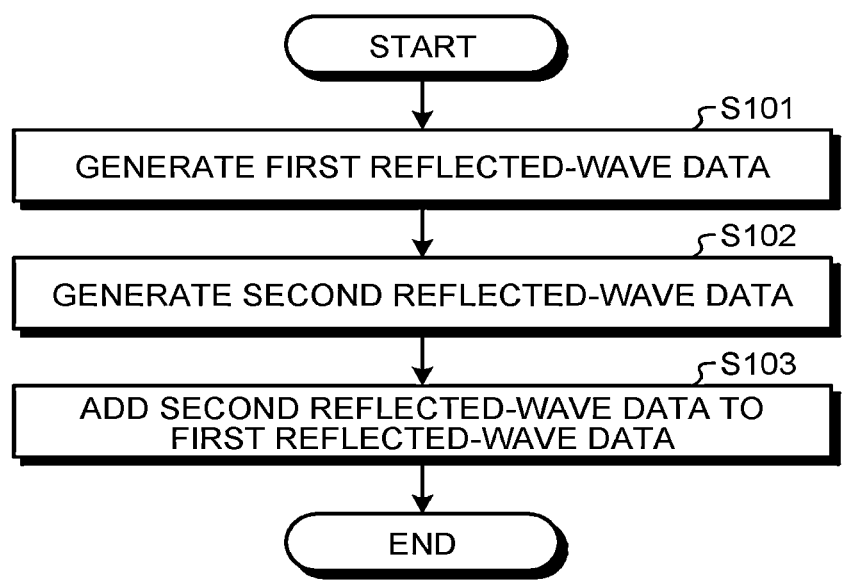

ULTRASOUND DIAGNOSIS APPARATUS

CROSS-REFERENCE TO RELATED APPLICATIONS

This application is based upon and claims the benefit of priority from Japanese Patent Application No. 2022-017044, filed on Feb. 7, 2022; the entire contents of which are incorporated herein by reference.

FIELD

Embodiments described herein relate generally to an ultrasound diagnosis apparatus.

BACKGROUND

Some ultrasound diagnosis apparatuses are configured to three-dimensionally scan a patient's body electronically. Examples of methods used by an ultrasound diagnosis apparatus for three-dimensionally scanning a patient's body electronically include the following method. FIG. 1A is a diagram illustrating an exemplary configuration of a conventional ultrasound diagnosis apparatus 200. As illustrated in FIG. 1A, the conventional ultrasound diagnosis apparatus 200 includes an ultrasound probe 201 and an apparatus main body 202.

The ultrasound probe 201 includes a plurality of transducer elements 203 arranged two-dimensionally and an electronic circuit 204. The plurality of transducer elements 203 arranged two-dimensionally may also be referred to as two-dimensional array transducer elements. FIG. 1B is a diagram illustrating an exemplary configuration of the conventional ultrasound probe 201. As illustrated in FIG. 1B, in a two-dimensional coordinate system having an x-axis and a y-axis, there are N lines of transducer elements (where N is a natural number) arranged along the y-axis direction, while each line has N transducer elements 203 arranged along the x-axis direction. In other words, in the example in FIG. 1B, the ultrasound probe 201 includes the transducer elements 203 of which the quantity is equal to $N^2$ (N×N). As illustrated in FIG. 1A, each of the $N^2$ transducer elements 203 is organized so as to belong to one of a plurality of groups called subarrays each including M transducer elements 203 (where M is a natural number smaller than N).

The electronic circuit 204 includes a plurality of blocks 205. Each of the blocks 205 is provided in correspondence with a different one of the subarrays. In other words, each of the blocks 205 is provided for a different one of the subarrays. Each of the blocks 205 is configured to cause the M transducer elements 203 included in the corresponding subarray to perform ultrasound transmission and reception.

Each of the blocks 205 includes one transmission beam former 205a, M pulsers 205b, M Transmission/Reception (T/R) switches 205c, M Low Noise Amplifiers (LNAs) 205d, M Variable Gain Amplifiers (VGAs) 205e, and one reception subarray beam former 205f. Among these, a transmission system is formed by the transmission beam former 205a and the pulsers 205b, whereas a reception system is formed by the LNAs 205d, the VGAs 205e, and the reception subarray beam former 205f.

In correspondence with each of the transducer elements 203, one pulser 205b, one transmission/reception switch 205c, one LNA 205d, and one VGA 205e are provided. Further, in correspondence with each of the subarrays, one set of reception subarray beam formers 205f is provided.

An operation in each of the blocks 205 included in the ultrasound probe 201 will be explained. When ultrasound transmission is to be performed, the transmission beam former 205a is configured to cause each of the plurality of (M) transducer elements 203 to transmit a delay-controlled ultrasound wave, via the corresponding pulser 205b. In other words, each of the pulsers 205b is configured to supply a delay-controlled drive signal to the corresponding transducer element 203. Each of the transmission/reception switches 205c is configured to separate the reception system and the transmission system from each other so as to prevent the transmission system from applying voltage to the reception system at the time of the ultrasound transmission. When ultrasound reception is to be performed, the transmission/reception switches 205c are configured to separate reception signals transmitted from the individual transducer elements 203 from the transmission system. Further, the LNAs 205d are configured to amplify the reception signals. Further, the VGAs 205e are configured to adjust gain of the amplified reception signals in accordance with depths. Further, the reception subarray beam former 205f is configured to apply a reception delay to the M gain-adjusted reception signals and to add up the M reception signals to which the reception delay was applied. Further, the reception subarray beam former 205f is configured to output a reception signal resulting from the addition, to the apparatus main body 202. In other words, the reception subarray beam formers 205f are configured to apply the reception delay to the reception signals in units of groups called the subarrays, to add up the signals, and to output the reception signals resulting from the addition. The beam forming process (a reception beam forming process) for each of the subarrays described above may be referred to as a subarray beam forming process. In this manner, the ultrasound probe 201 is configured to output as many reception signals as the quantity of the subarrays, to the apparatus main body 202.

The apparatus main body 202 includes a reception beam former 206. The reception beam former 206 is configured to apply a reception delay to the plurality of reception signals (as many reception signals as the quantity of the subarrays) output from the ultrasound probe 201 and to add up the reception signals to which the reception delay was applied. Further, the apparatus main body 202 is configured to generate ultrasound image data by using a signal resulting from the addition.

Further, for the "N×N" two-dimensional array transducer elements (the $N^2$ transducer elements arranged in the formation of N rows in the row direction by N columns in the column direction) as illustrated in FIG. 1B, as many pulsers 205b as $N^2$, as many LNAs 205d as $N^2$, and as many VGAs 205e as $N^2$ are used, as illustrated in FIG. 1A. This configuration will hereinafter be referred to as "2DA". An electronic circuit including the $N^2$ pulsers 205b, the $N^2$ LNAs 205d, and the $N^2$ VGAs 205e is provided inside the ultrasound probe 201, for example, as illustrated in FIG. 1A.

In this situation, as the value of N increases, the quantity of the electronic circuits dramatically increases. For this reason, problems arise from the viewpoint of the installation area, heat generation, and the like. For example, when the value of N is 128, it is necessary to have 16,384 pulsers 205b, 16,384 LNAs 205d, and 16,384 VGAs 205e. When a set made up of one pulser 205b, one LNA 205d, and one VGA 205e is regarded as one electronic circuit, it is necessary to have 16,384 electronic circuits. From the viewpoint of the installation area, heat generation, and the like, it would be difficult to install the electronic circuits in such a large quantity on the inside of the ultrasound probe 201.

By performing the subarray beam forming process according to the conventional technique described above, when the reception beam forming process is performed inside the ultrasound probe 201 with respect to each set including M transducer elements 203, the quantity of cables connecting the ultrasound probe 201 to the apparatus main body 202 is (1/M) times as large as the quantity of cables used when the subarray beam forming process is not performed. Thus, it is possible to reduce the quantity of cables by performing the subarray beam forming processes. However, the quantity of electronic circuits such as the pulsers 205b, the LNAs 205d, the VGAs 205e, and the like would not be reduced.

In relation to the above, as a conventional method for reducing the quantity of the electronic circuits, known techniques include a conventional technique called Row-Column Addressing (RCA), which is disclosed in a patent document (U.S. Pat. No. 9,855,022) and the like.

An example of the conventional technique called RCA will be explained. FIGS. 2A and 2B are drawings for explaining the example of the RCA scheme. FIG. 3 is a diagram illustrating an exemplary configuration of a conventional ultrasound diagnosis apparatus 300 having a structure with the example of the RCA scheme explained with reference to FIGS. 2A and 2B. As illustrated in FIG. 3, the ultrasound diagnosis apparatus 300 includes an ultrasound probe 301 and an apparatus main body 302.

The ultrasound probe 301 includes N×N two-dimensional array transducer elements. In other words, as illustrated in FIGS. 2A and 2B, the ultrasound probe 301 includes, as a transducer element group (a transducer element array) having an RCA structure, $N^2$ transducer elements 303 that are arranged in the formation of N rows in the row direction (an x-axis direction) by N columns in the column direction (a y-axis direction). In this manner, the ultrasound diagnosis apparatus 300 illustrated in FIG. 3 includes the transducer element group having the RCA structure.

The apparatus main body 302 includes as many pulsers 304 as N, a transmission beam former 305, as many LNAs 306 as N, as many VGAs 307 as N, and a reception beam former 308.

An operation performed by the ultrasound diagnosis apparatus 300 will be explained. When the ultrasound diagnosis apparatus 300 is to perform ultrasound transmission, as illustrated in FIG. 2A, one of the two surfaces (e.g., the front surface) of each of the N transducer elements 303 arranged in the column direction (the y-axis direction) are connected in common to one another. In other words, in the ultrasound diagnosis apparatus 300, the N transducer elements 303 arranged in the column direction (the y-axis direction) are connected in common to one another. As a result, while each of transducer element groups 303a includes the N transducer elements 303 that are connected in series and arranged in the column direction, as many transducer element groups 303a as N are arranged in the row direction (the x-axis direction).

As illustrated in FIG. 3, one pulser 304 is provided for each of the transducer element groups 303a. Because the quantity of the transducer element groups 303a is N, the apparatus main body 302 includes as many pulsers 304 as N. Accordingly, when each of the pulsers 304 is regarded as one electronic circuit, the apparatus main body 302 needs N electronic circuits when the ultrasound diagnosis apparatus 300 performs ultrasound transmission.

Further, via the pulsers 304, the transmission beam former 305 is configured to cause an ultrasound wave to which a transmission delay is applied in the row direction to be transmitted from the other surfaces (e.g., the rear surfaces) of the N transducer elements 303 included in the transducer element groups 303a. The transmission beam former 305 is configured to perform this process for each of the transducer element groups 303a.

Subsequently, when the ultrasound diagnosis apparatus 300 is to perform ultrasound reception, as illustrated in FIG. 2B, the other (e.g., the rear surface) of the two surfaces of each of the N transducer elements 303 arranged in the row direction (the x-axis direction) are connected in common to one another. In other words, in the ultrasound diagnosis apparatus 300, the N transducer elements 303 arranged in the row direction (the x-axis direction) are connected in common to one another. As a result, while each of transducer element groups 303b includes the N transducer elements 303 that are connected in series and arranged in the row direction, as many transducer element groups 303b as N are arranged in the column direction (the y-axis direction).

As illustrated in FIG. 3, one LNA 306 and one VGA 307 are provided for each of the transducer element groups 303b. Because the quantity of the transducer element groups 303b is N, the apparatus main body 302 includes as many LNAs 306 as N and as many VGAs 307 as N.

Each of the LNAs 306 is configured to amplify a reception signal output from the corresponding transducer element group 303b. In this situation, the reception signal output from each of the transducer element groups 303b is a reception signal obtained by adding up (combining) M reception signals output from the M transducer elements 303 included in the transducer element group 303b. Further, each of the VGAs 307 is configured to adjust gain of the amplified reception signal in accordance with depth. Further, an Analog to Digital (A/D) converter is configured to convert the reception signal, which is the gain-adjusted signal in an analog format (an analog signal), into a signal in a digital format (a digital signal). After that, the reception beam former 308 is configured to apply a reception delay to the N gain-adjusted reception signals (the digital signals) and to add up the N reception signals to which the reception delay was applied. Further, the apparatus main body 302 is configured to generate ultrasound image data by using the reception signal resulting from the addition.

As illustrated in FIG. 3, one LNA 306 and one VGA 307 are provided for each of the transducer element groups 303b. Because the quantity of the transducer element groups 303b is N, the apparatus main body 302 includes as many LNAs 306 as N and as many VGAs 307 as N. Accordingly, when a set made up of one LNA 306 and one VGA 307 is regarded as one electronic circuit, the apparatus main body 302 needs N electronic circuits when the ultrasound diagnosis apparatus 300 performs ultrasound reception. Consequently, when the ultrasound diagnosis apparatus 300 performs ultrasound transmission and reception, the apparatus main body 302 needs 2N electronic circuits. For example, when the value of N is 128, the ultrasound diagnosis apparatus 200 needs 16,384 electronic circuits as explained above. In contrast, the ultrasound diagnosis apparatus 300 needs only 256 (2×128) electronic circuits. In this situation, the quantity of the electronic circuits needed by the ultrasound diagnosis apparatus 300 is 1/64 times as large as the quantity of the electronic circuits needed by the ultrasound diagnosis apparatus 200. Accordingly, the ultrasound diagnosis apparatus 300 is able to significantly reduce the quantity of the electronic circuits that are needed.

Further, because the reception system and the transmission system are separated from each other to begin with, it is not necessary to provide a transmission/reception switch for separating the reception system from the transmission system. In this aspect also, the ultrasound diagnosis apparatus 300 is able to reduce the quantity of the electronic circuits, compared to the ultrasound diagnosis apparatus 200.

However, the image quality of an ultrasound image based on the ultrasound image data generated by the ultrasound diagnosis apparatus 300 is significantly lower than the image quality of an ultrasound image based on the ultrasound image data generated by the ultrasound diagnosis apparatus 200.

FIG. 4A is a contour line chart at 6-dB intervals expressing a Point Spread Function (PSF) of the ultrasound diagnosis apparatus 200 based on the 2DA scheme, as viewed from a z-axis direction. In the situation depicted in FIG. 4A, reception apodization and transmission apodization are not implemented. In this situation, the reception apodization is a technique by which, for example, reception signals that are from mutually the same sampling points and are received by a plurality of transducer elements structuring a reception aperture of an ultrasound probe are weighted by using an apodization function (an aperture function), before performing a phased addition process. The apodization function is a mathematical function set with a weight for each of different positions of the transducer elements. Further, the transmission apodization is a technique by which, for example, the amplitude of an ultrasound wave transmitted by a plurality of transducer elements structuring a transmission aperture of an ultrasound probe is varied for each of different positions of the transducer elements.

FIGS. 4B and 4C are each a contour line chart at 6-dB intervals expressing a PSF of the ultrasound diagnosis apparatus 300 including the transducer element groups having the RCA structure, as viewed from the z-axis direction. In the example in FIG. 4B, reception apodization and transmission apodization are not implemented. In contrast, in the example in FIG. 4C, reception apodization and transmission apodization are implemented.

FIG. 5A expresses the situation in FIG. 4A by using an image 210 depicting the range from the peak to −40 dB. FIG. 5B expresses the situation in FIG. 4B by using an image 310 depicting the range from the peak to −40 dB. FIG. 5C expresses the situation in FIG. 4C by using an image 311 depicting the range from the peak to −40 dB.

As the image 210 is compared with the image 310, it is observed that, with the ultrasound diagnosis apparatus 300 not implementing the reception apodization and the transmission apodization, the main lobe has slightly spread, and the spatial resolution is lower, compared to the example with the ultrasound diagnosis apparatus 200. Further, as the image 210 is compared with the image 310, it is observed that, with the ultrasound diagnosis apparatus 300 not implementing the reception apodization and the transmission apodization, there are larger side lobes along the x-axis and the y-axis compared to the example with the ultrasound diagnosis apparatus 200, which means that artifacts occur more easily.

As the image 210 is compared with the image 310 and the image 311, it is observed that, with the ultrasound diagnosis apparatus 300 implementing the reception apodization and the transmission apodization, the main lobe has significantly spread, and the spatial resolution is significantly lower, compared to the examples with the ultrasound diagnosis apparatus 200 and the ultrasound diagnosis apparatus 300 not implementing the reception apodization and the transmission apodization. Further, as the image 210 is compared with the image 310 and the image 311, with the ultrasound diagnosis apparatus 300 implementing the reception apodization and the transmission apodization, the side lobes along the x-axis and the y-axis are smaller than those in the example with the ultrasound diagnosis apparatus 300 not implementing the reception apodization and the transmission apodization, but the side lobes along the x-axis and the y-axis are larger than those in the example with the ultrasound diagnosis apparatus 200. Accordingly, it is understood that, with the ultrasound diagnosis apparatus 300 implementing the reception apodization and the transmission apodization, artifacts occur more easily than in the example with the ultrasound diagnosis apparatus 200.

As explained above, in comparison to the ultrasound diagnosis apparatus 200 based on the 2DA scheme, the ultrasound diagnosis apparatus 300 including the transducer element groups having the RCA structure has an advantage where the quantity of the necessary electronic circuits is reduced, but has a problem where the image quality is not satisfactory.

Further, another technique is known by which, when ultrasound transmission has been performed in the row direction (e.g., the x-axis direction), an ultrasound wave (a reflected wave) is received by a plurality of transducer elements arranged in the row direction and a plurality of transducer elements arranged in the column direction (e.g., the y-axis direction), and subsequently when ultrasound transmission has been performed in the column direction, an ultrasound wave (a reflected wave) is received by a plurality of transducer elements arranged in the row direction and a plurality of transducer elements arranged in the column direction, so as to multiply two envelope signals together. However, this technique will not work unless the imaged subject is a point reflector that does not overlap. For this reason, a dilute contrast agent is used, for example.

Next, we will further discuss what causes the image quality of the ultrasound image based on the ultrasound image data generated by the ultrasound diagnosis apparatus 300 including the transducer element groups having the RCA structure to be significantly lower than the image quality of the ultrasound image based on the ultrasound image data generated by the ultrasound diagnosis apparatus 200 based on the 2DA scheme.

FIGS. 6A to 6F are drawings for explaining an example of a mode of ultrasound transmission and reception performed by the conventional ultrasound diagnosis apparatus 300. For example, let us discuss a situation in which the ultrasound diagnosis apparatus 300 transmits an ultrasound wave as illustrated in FIGS. 6A to 6C and receives an ultrasound wave (a reflected wave) as illustrated in FIGS. 6D to 6F.

As illustrated in FIGS. 6A to 6C, at the time of the ultrasound transmission, the ultrasound diagnosis apparatus 300 is configured to apply a focus (a transmission focus) to the x-axis direction, but for the y-axis direction, to transmit a plane wave without applying a focus. For example, the ultrasound diagnosis apparatus 300 is configured to perform, with respect to each of the transducer element groups 303a, a process of causing the N transducer elements 303 included in the transducer element group 303a to transmit an ultrasound wave to which the transmission delay is applied in the row direction (the x-axis direction).

Further, as illustrated in FIGS. 6D to 6F, at the time of the ultrasound reception, the ultrasound diagnosis apparatus 300 is configured to apply a focus (a reception focus) to the y-axis direction, but for the x-axis direction, to receive a plane wave without applying a focus. Further, the ultrasound diagnosis apparatus 300 is configured to apply the reception delay to the reception signals (the digital signals) based on the reception signals (the analog signals) output from the N transducer element groups 303b and to further add up the N reception signals to which the reception delay was applied. After that, the ultrasound diagnosis apparatus 300 is configured to generate ultrasound image data by using the reception signal resulting from the addition.

When the acoustic field of a focus point is approximated by using a sinc function, it is possible to express, for the ultrasound diagnosis apparatus 300, the acoustic field of the ultrasound transmission and reception as sinc(x)sinc(y). In contrast, for the ultrasound diagnosis apparatus 200 based on the 2DA scheme, because it is possible to apply a focus to both the ultrasound transmission and the ultrasound reception, the acoustic field is expressed as $(\text{sinc}(x)\text{sinc}(y))^2$. Consequently, the image quality of the ultrasound image based on the ultrasound image data generated by the ultrasound diagnosis apparatus 300 including the transducer element groups having the RCA structure is significantly lower than the image quality of the ultrasound image based on the ultrasound image data generated by the ultrasound diagnosis apparatus 200 based on the 2DA scheme.

BRIEF DESCRIPTION OF THE DRAWINGS

FIG. 1A is a diagram illustrating an exemplary configuration of a conventional ultrasound diagnosis apparatus;

FIG. 11 is a flowchart illustrating a flow in an example of processes from when a transmission circuit and signal processing circuitry according to the first embodiment generate the first reflected-wave data and the second reflected-wave data to when data resulting from addition is obtained;

DETAILED DESCRIPTION

An ultrasound diagnosis apparatus according to an embodiment includes an ultrasound probe and processing circuitry. The ultrasound probe includes a plurality of transducer elements arranged two-dimensionally. The processing circuitry is configured to generate ultrasound image data on the basis of reception signals obtained by the ultrasound probe. The processing circuitry is configured to cause a display unit to display an ultrasound image based on the ultrasound image data. The plurality of transducer elements are a plurality of Row-Column Addressing transducer elements configured so that: when a first ultrasound wave is to be transmitted, the first ultrasound wave is caused to be transmitted from a first transducer element group including a plurality of transducer elements that are arranged in a direction along one of two axes intersecting each other and are connected in common to one another; when a reflected wave of the first ultrasound wave is to be received, the reflected wave of the first ultrasound wave is caused to be received by a second transducer element group including a plurality of transducer elements that are arranged in a direction along the other of the two axes and are connected in common to one another; when a second ultrasound wave is to be transmitted, the second ultrasound wave is caused to be transmitted from the second transducer element group; and when a reflected wave of the second ultrasound wave is to be received, the reflected wave of the second ultrasound wave is caused to be received by the first transducer element group. The processing circuitry is configured to generate the ultrasound image data on the basis of a first reception signal obtained by causing the reflected wave of the first ultrasound wave to be received by the second transducer element group and a second reception signal obtained by causing the reflected wave of the second ultrasound wave to be received by the first transducer element group.

Exemplary embodiments of an ultrasound diagnosis apparatus will be explained below, with reference to the accompanying drawings.

First Embodiment

Figure 7:
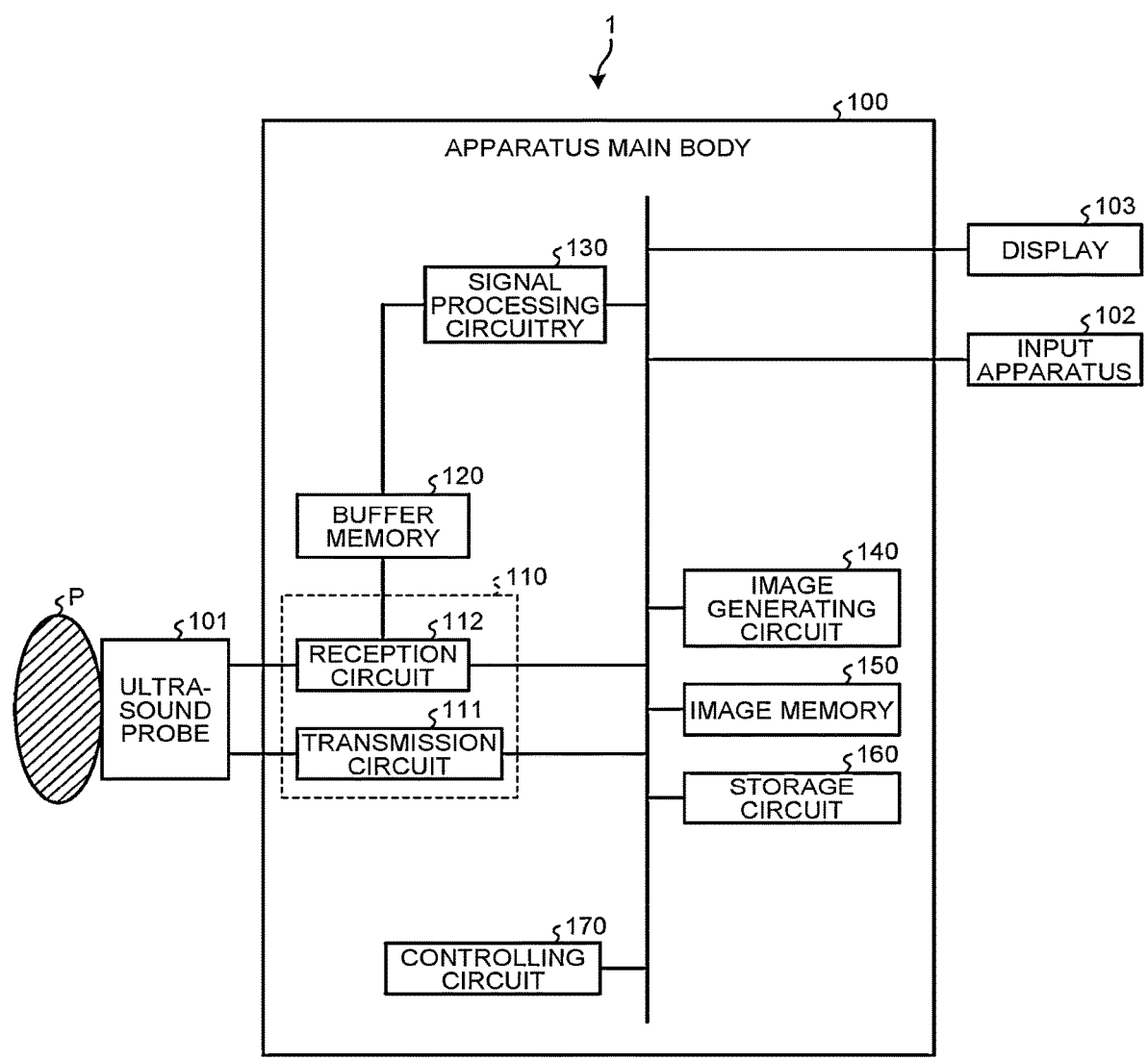
FIG. 7 is a block diagram illustrating an exemplary configuration of an ultrasound diagnosis apparatus according to a first embodiment.

FIG. 7 is a block diagram illustrating an exemplary configuration of an ultrasound diagnosis apparatus 1 according to a first embodiment. As illustrated in FIG. 7, the ultrasound diagnosis apparatus 1 according to the first embodiment includes an apparatus main body 100, an ultrasound probe 101, an input apparatus 102, and a display 103.

For example, the ultrasound probe 101 includes a plurality of transducer elements (piezoelectric elements). The plurality of transducer elements are configured to generate an ultrasound wave on the basis of a drive signal supplied from a transmission circuit 111 in a transmission and reception circuit 110 included in the apparatus main body 100. More specifically, as a result of the transmission circuit 111 applying voltage (transmission drive voltage), the plurality of transducer elements are configured to generate the ultrasound wave having a waveform corresponding to the transmission drive voltage. The waveform of the transmission drive voltage indicated by the drive signal is the waveform of the voltage applied to the plurality of transducer elements. In other words, the ultrasound probe 101 is configured to transmit the ultrasound wave corresponding to the magnitude of the applied transmission drive voltage to an examined subject (hereinafter, "patient") P. Further, the ultrasound probe 101 is configured to receive a reflected wave from the patient P, to convert the reflected wave into a reflected-wave signal (a reception signal) realized with an electrical signal, and to output the reflected-wave signal to the apparatus main body 100. Further, for example, the ultrasound probe 101 includes a matching layer provided for the transducer elements, a backing member configured to prevent the ultrasound wave from propagating rearwards from the transducer elements, and the like. In this situation, the ultrasound probe 101 is detachably connected to the apparatus main body 100.

When the ultrasound wave is transmitted from the ultrasound probe 101 to the patient P, the transmitted ultrasound wave is repeatedly reflected on a surface of discontinuity of acoustic impedances at a tissue in the body of the patient P and is received as the reflected wave by the plurality of transducer elements included in the ultrasound probe 101. The amplitude of the received reflected wave is dependent on the difference between the acoustic impedances on the surface of discontinuity on which the ultrasound wave is reflected. When a transmitted ultrasound pulse is reflected on the surface of a moving blood flow, a cardiac wall, or the like, the reflected wave is, due to the Doppler effect, subject to a frequency shift, depending on a velocity component of the moving members with respect to the ultrasound wave transmission direction. Further, the ultrasound probe 101 is configured to output the reflected-wave signal to a reception circuit 112 in the transmission and reception circuit 110 (explained later).

The ultrasound probe 101 can be attached to and detached from the apparatus main body 100. When a two-dimensional region in the patient P is to be scanned (a two-dimensional scan), for example, an operator connects, as the ultrasound probe 101, a one-dimensional (1D) array probe in which the plurality of transducer elements (ultrasound elements) are arranged in a single line, to the apparatus main body 100. Examples of different types of 1D array probes include linear ultrasound probes, convex ultrasound probes, and sector ultrasound probes. Further, when a three-dimensional region in the patient P is to be scanned (a three-dimensional scan), for example, the operator connects, as the ultrasound probe 101, a mechanical four-dimensional (4D) probe or a two-dimensional (2D) array probe, to the apparatus main body 100. The mechanical 4D probe is capable of performing a two-dimensional scan by using a plurality of transducer elements arranged in a single line like in the 1D array probe and is also capable of performing a three-dimensional scan by swinging the plurality of transducer elements at a predetermined angle (a swing angle). Further, the 2D array probe is capable of performing a three-dimensional scan by using a plurality of transducer elements arranged in a matrix formation and is also capable of performing a two-dimensional scan by transmitting an ultrasound wave in a converged manner. In the following sections, an example will be explained in which the ultrasound probe 101 is a 2D array probe.

Figure 8:
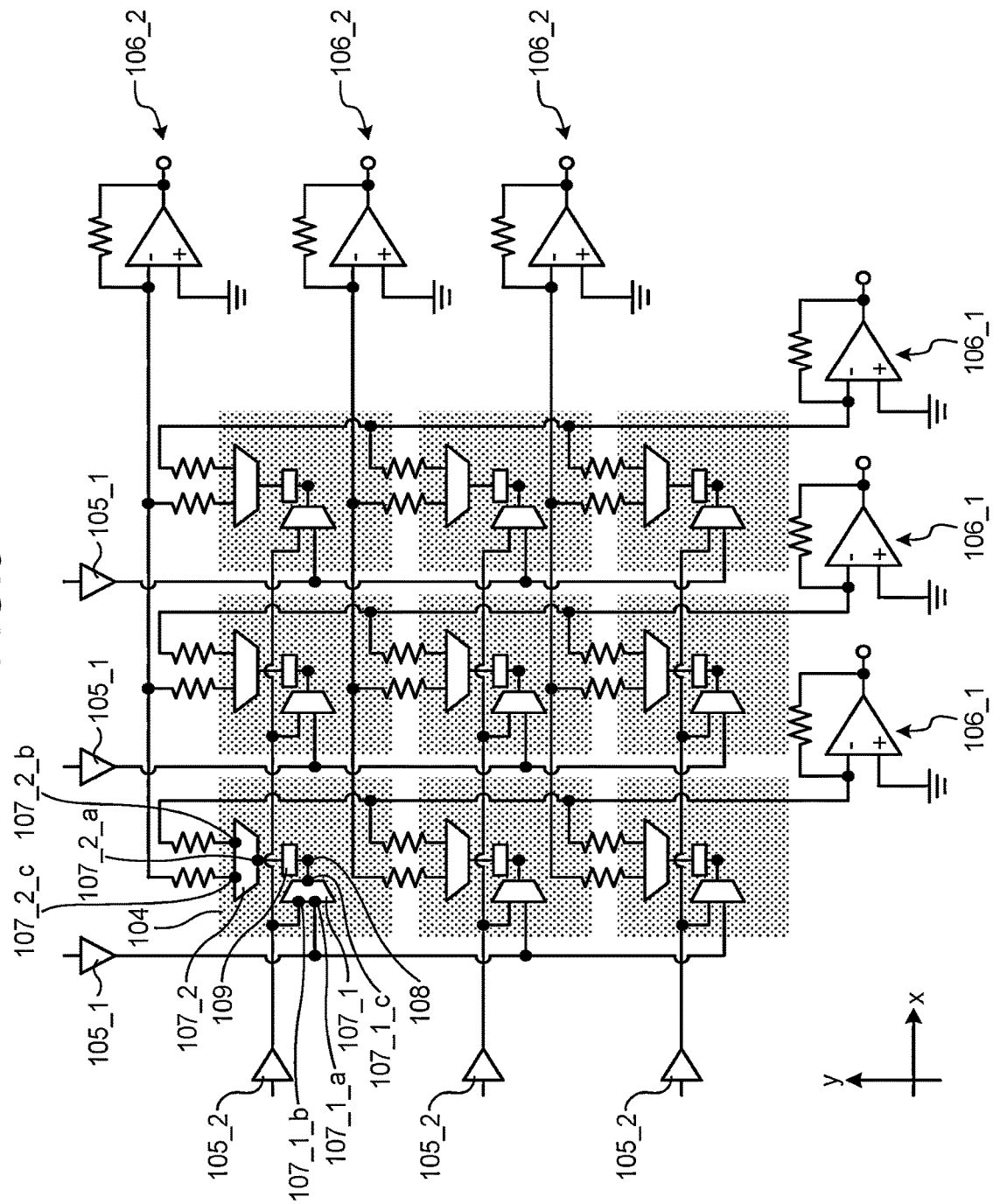
FIG. 8 is a diagram illustrating an exemplary configuration of an ultrasound probe according to the first embodiment.

FIG. 8 is a diagram illustrating an exemplary configuration of the ultrasound probe 101 according to the first embodiment. As illustrated in FIG. 8, the ultrasound probe 101 includes a plurality of transducer elements 104 forming transducer element groups having an RCA structure. For example, in a two-dimensional coordinate system structured with an x-axis and a y-axis, the ultrasound probe 101 includes $N^2$ transducer elements 104 arranged in the formation of N rows in the x-axis direction by N columns in the y-axis direction. Thus, the ultrasound probe 101 includes the plurality of transducer elements 104 arranged two-dimensionally. In the example in FIG. 8, the value of N is 3; however, possible values of N are not limited to this example.

The transducer elements 104 are configured, for example, by using Micromachined Ultrasound Transducers (MUTs). Examples of the MUTs include Capacitive Micromachined Ultrasound Transducers (CMUTs). Each of the cells of the MUTs corresponds to one transducer element 104.

The transducer elements 104 are configured to transmit ultrasound waves on the basis of drive signals supplied by pulsers 105_1 and 105_2 included in the transmission circuit 111. Further, upon receipt of reflected waves, the transducer elements 104 are configured to output reflected-wave signals corresponding to the received reflected waves to amplifiers 106_1 and 106_2 included in the reception circuit 112.

One pulser 105_1 is provided for each of transducer element groups 104a (see FIG. 9A) including N transducer elements 104 arranged in the column direction (the y-axis direction). In other words, each of the plurality of pulsers 105_1 is provided in correspondence with a different one of the transducer element groups 104a. Also, one amplifier 106_1 is provided for each of the transducer element groups 104a. In other words, each of the plurality of amplifiers 106_1 is provided in correspondence with a different one of the transducer element groups 104a.

One pulser 105_2 is provided for each of transducer element groups 104b (see FIG. 9D) including N transducer elements 104 arranged in the row direction (the x-axis direction). In other words, each of the plurality of pulsers 105_2 is provided in correspondence with a different one of the transducer element groups 104b. Also, one amplifier 106_2 is provided for each of the transducer element groups 104b. In other words, each of the plurality of amplifiers 106_2 is provided in correspondence with a different one of the transducer element groups 104b.

Further, as illustrated in FIG. 8, the ultrasound probe 101 includes, in correspondence with each of the transducer elements 104, one multiplexer 107_1, one demultiplexer 107_2, one electrode contact point (an element electrode contact point) 108 for contact with the transducer element 104 serving as an ultrasound element, and one switch 109. In other words, with respect to each of the transducer elements 104, the ultrasound probe 101 includes a single multiplexer 107_1, a single demultiplexer 107_2, a single electrode contact point 108 for contact with the transducer element 104 serving as the ultrasound element, and a single switch 109.

Each of the pulsers 105_1 is connected to first input terminals 107_1_a of the N multiplexers 107_1 of the N transducer elements 104 included in the corresponding one of the transducer element groups 104a. Also, each of the pulsers 105_2 is connected to second input terminals 107_1_b of the N multiplexers 107_1 of the N transducer elements 104 included in the corresponding one of the transducer element groups 104b.

Further, to each of the multiplexers 107_1, a control signal from a controlling circuit 170 in the apparatus main body 100 is input. On the basis of the control signal being input thereto, each of the multiplexers 107_1 is configured to supply one of the following to the corresponding transducer element 104 via the electrode contact point 108: a drive signal that was supplied by the pulser 105_1 and was input to the first input terminal 107_1_a; and a drive signal that was supplied by the pulser 105_2 and was input to the second input terminal 107_1_b. For example, each of the multiplexers 107_1 is configured to supply the drive signal to the corresponding transducer element 104, by outputting the drive signal from an output terminal 107_1_c of the multiplexer 107_1.

Each of the electrode contact points 108 is connected to an input terminal 107_2_a of the corresponding demultiplexer 107_2 via the corresponding switch 109. Accordingly, to the input terminal 107_2_a of each of the demultiplexers 107_2, the reflected-wave signal from the corresponding transducer element 104 is input.

Further, each of the amplifiers 106_1 is connected to first output terminals 107_2_b of the N demultiplexers 107_2 of the N transducer elements 104 included in the corresponding one of the transducer element groups 104a. Also, each of the amplifiers 106_2 is connected to second output terminals 107_2_c of the N demultiplexers 107_2 of the N transducer elements 104 included in the corresponding one of the transducer element groups 104b.

Further, to each of the demultiplexers 107_2, a control signal from the controlling circuit 170 of the apparatus main body 100 is input. On the basis of the control signal being input thereto, each of the demultiplexers 107_2 is configured to output the reflected-wave signal input to the input terminal 107_2_a by performing one of the following: outputting the reflected-wave signal from the first output terminal 107_2_b so as to be output to a corresponding one of the amplifiers 106_1; and outputting the reflected-wave signal from the second output terminal 107_2_c so as to be output to a corresponding one of the amplifiers 106_2.

Returning to the description of FIG. 7, for example, the input apparatus 102 is realized by using input means such as a mouse, a keyboard, a button, a panel switch, a touch command screen, a foot switch, a trackball, a joystick, and/or the like. The input apparatus 102 is configured to receive various types of setting requests from the operator of the ultrasound diagnosis apparatus 1 and to transfer the received various types of setting requests to the apparatus main body 100.

For example, the display 103 is configured to display a Graphical User Interface (GUI) used by the operator of the ultrasound diagnosis apparatus 1 for inputting the various types of setting requests via the input apparatus 102 and to display an ultrasound image based on the ultrasound image data generated in the apparatus main body 100, and the like. The display 103 is realized by using a liquid crystal monitor, a Cathode Ray Tube (CRT) monitor, or the like. The display 103 is an example of the display unit.

Figure 1B:
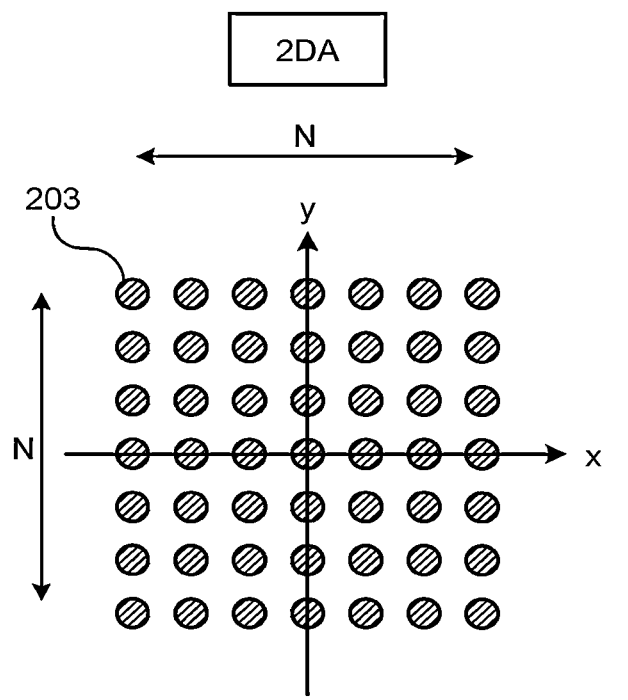
FIG. 1B is a diagram illustrating an exemplary configuration of a conventional ultrasound probe.
Figure 2A:
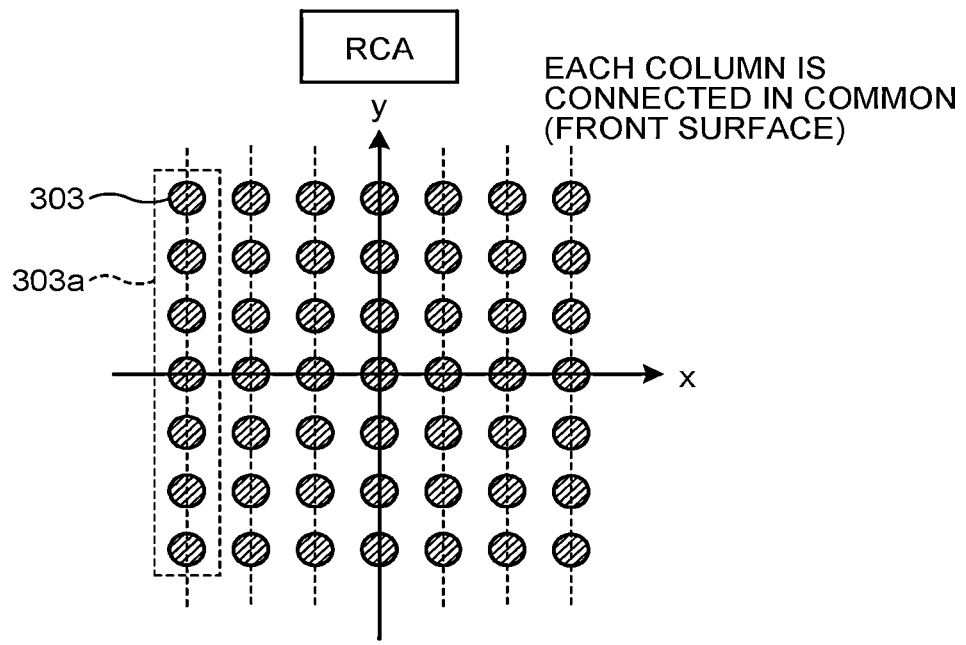
FIG. 2A is a drawing for explaining an example of an RCA scheme.
Figure 2B:
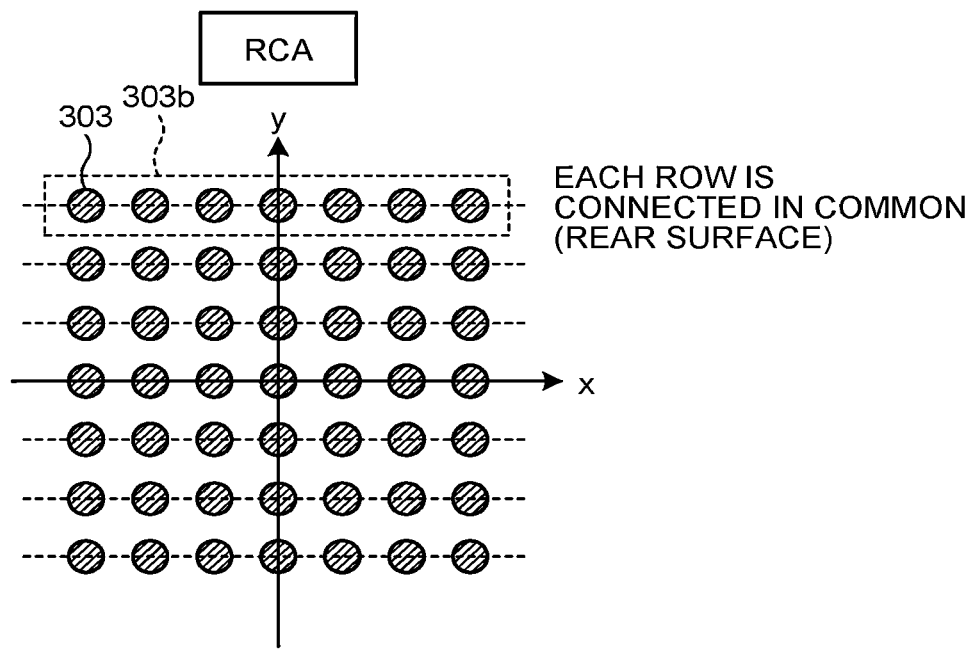
FIG. 2B is another drawing for explaining the example of the RCA scheme.
Figure 3:
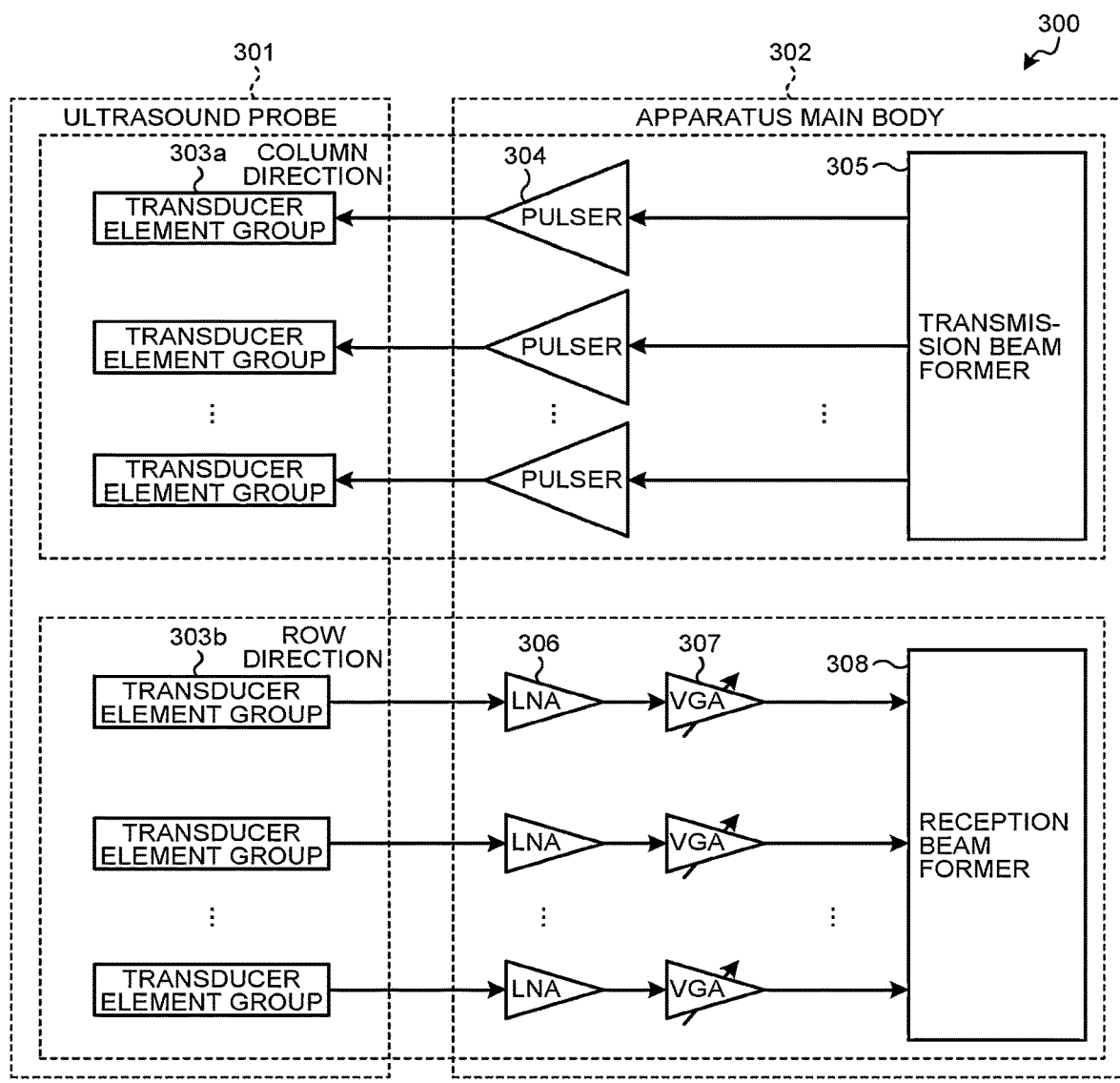
FIG. 3 is a diagram illustrating an exemplary configuration of a conventional ultrasound diagnosis apparatus having a structure with the example of the RCA scheme explained with reference to FIGS. 2A and 2B.
Figure 4A:
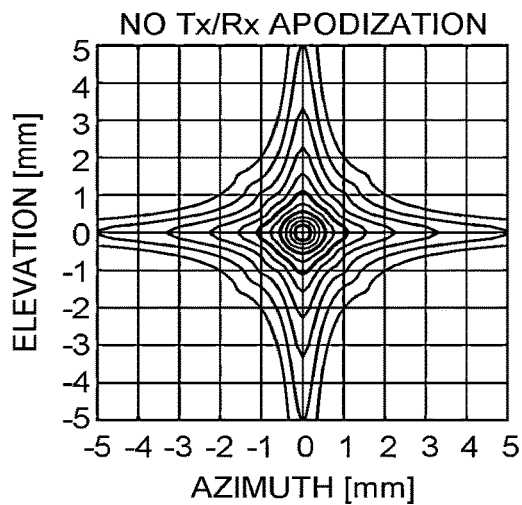
FIG. 4A is a contour line chart at 6-dB intervals expressing a Point Spread Function (PSF) of the ultrasound diagnosis apparatus based on the 2DA scheme, as viewed from a z-axis direction.
Figure 4B:
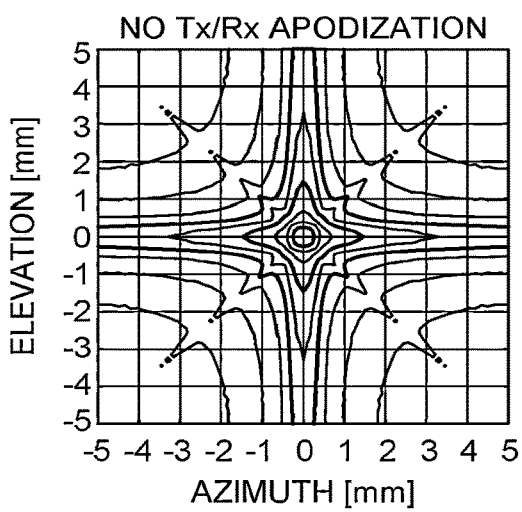
FIG. 4B is a contour line chart at 6-dB intervals expressing the PSF of the ultrasound diagnosis apparatus implementing the RCA, as viewed from the z-axis direction.
Figure 4C:
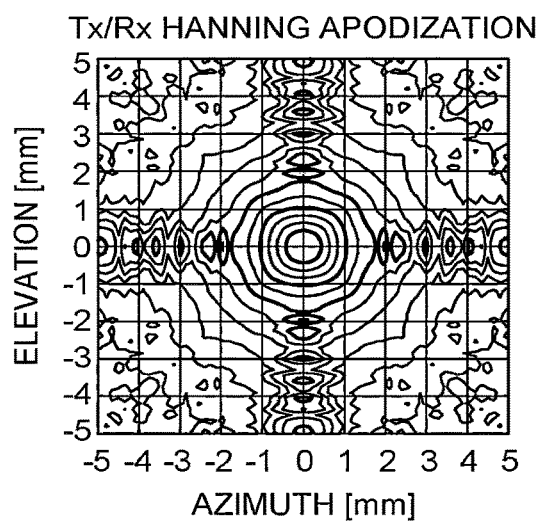
FIG. 4C is another contour line chart at 6-dB intervals expressing the PSF of the ultrasound diagnosis apparatus implementing the RCA, as viewed from the z-axis direction.
Figure 5A:
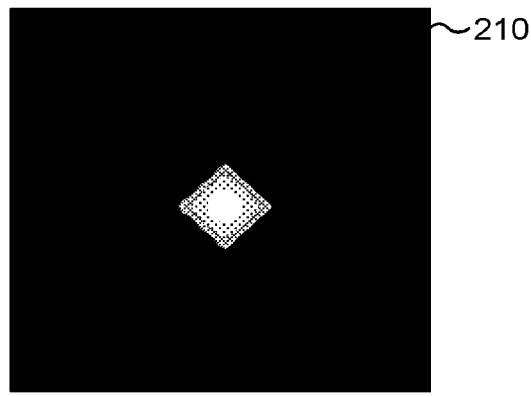
FIG. 5A expresses the situation in FIG. 4A by using an image depicting the range from the peak to −40 dB.
Figure 5B:
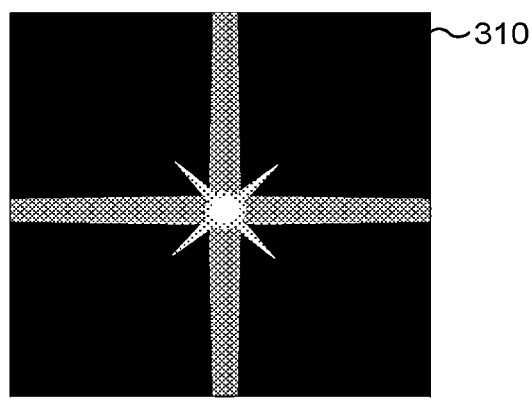
FIG. 5B expresses the situation in FIG. 4B by using an image depicting the range from the peak to −40 dB.
Figure 5C:
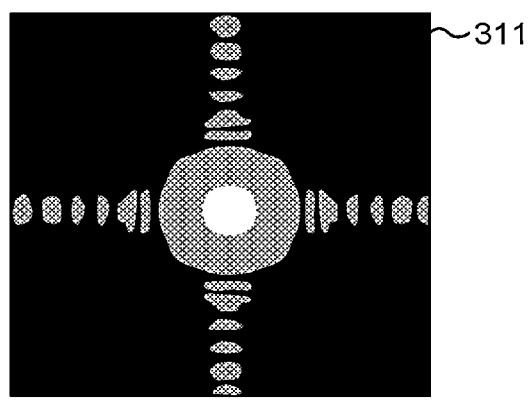
FIG. 5C expresses the situation in FIG. 4C by using an image depicting the range from the peak to −40 dB.

The apparatus main body 100 is configured to generate the ultrasound image data on the basis of the reflected-wave signal transmitted thereto from the ultrasound probe 101. In this situation, the ultrasound image data is an example of image data. The apparatus main body 100 is capable of generating two-dimensional ultrasound image data on the basis of the reflected-wave signal corresponding to a two-dimensional region of the patient P and having been transmitted thereto from the ultrasound probe 101. Further, the apparatus main body 100 is capable of generating three-dimensional ultrasound image data on the basis of the reflected-wave signal corresponding to a three-dimensional region of the patient P and having been transmitted thereto from the ultrasound probe 101. As illustrated in FIG. 1, the apparatus main body 100 includes the transmission and reception circuit 110, a buffer memory 120, signal processing circuitry 130, an image generating circuit 140, an image memory 150, a storage circuit 160, and the controlling circuit 170.

Under control of the controlling circuit 170, the transmission and reception circuit 110 is configured to cause the ultrasound probe 101 to transmit an ultrasound wave and to cause the ultrasound probe 101 to receive a reflected wave of the ultrasound wave. In other words, the transmission and reception circuit 110 is configured to perform a scan via the ultrasound probe 101. The scan may be referred to as scanning, an ultrasound scan, or an ultrasonic scan. The transmission and reception circuit 110 is an example of a transmission and reception unit. The transmission and reception circuit 110 includes the transmission circuit 111 and the reception circuit 112.

Under the control of the controlling circuit 170, the transmission circuit 111 is configured to cause the ultrasound wave to be transmitted from the ultrasound probe 101. Under the control of the controlling circuit 170, the transmission circuit 111 is configured to supply the drive signal to the ultrasound probe 101. When a two-dimensional region in the patient P is to be scanned, the transmission circuit 111 is configured to cause the ultrasound probe 101 to transmit an ultrasound beam for scanning the two-dimensional region. In contrast, when a three-dimensional region in the patient P is to be scanned, the transmission circuit 111 is configured to cause the ultrasound probe 101 to transmit an ultrasound beam for scanning the three-dimensional region.

The transmission circuit 111 includes the pulsers 105_1 and 105_2 (see FIG. 8) and a transmission beam former (not illustrated). Via the pulsers 105_1 and 105_2, the transmission beam former is configured to cause a delay-controlled ultrasound wave to be transmitted from each of the plurality of transducer elements 104 included in the transducer element groups 104*a* and each of the plurality of transducer elements 104 included in the transducer element groups 104*b*.

The transmission beam former includes a rate pulser generating circuit and a transmission delay circuit. The rate pulser generating circuit is configured to repeatedly generate a rate pulse for forming a transmission ultrasound wave (a transmission beam) at a predetermined rate frequency (a Pulse Repetition Frequency (PRF)). As a result of the rate pulse being routed through the transmission delay circuit, voltage is applied to the pulsers 105_1 and 105_2 while having mutually-different transmission delay time periods. For example, the transmission delay circuit is configured to apply the transmission delay time period that corresponds to each of the transducer elements and is required to converge the ultrasound wave generated from the ultrasound probe 101 into the form of a beam and to determine transmission directionality, to each of the rate pulses generated by the rate pulser generating circuit.

Each of the pulsers 105_1 and 105_2 is configured to supply the delay-controlled drive signal (a drive pulse) to the corresponding transducer elements 104. Each of the pulsers 105_1 and 105_2 is configured to supply the drive signal to the ultrasound probe 101 with timing based on the rate pulses. In other words, each of the pulsers 105_1 and 105_2 is configured to apply voltage (transmission drive voltage) having a waveform indicated by the drive signal to the ultrasound probe 101, with the timing based on the rate pulses. The transmission delay circuit is configured to arbitrarily adjust the transmission direction of the ultrasound wave transmitted from transmission surfaces of the transducer elements 104, by varying the transmission delay time period applied to each of the rate pulses.

The drive pulse travels from each of the pulsers 105_1 and 105_2 and reaches the corresponding transducer elements 104 in the ultrasound probe 101 via a cable and is subsequently converted at the transducer elements 104 from an electrical signal into mechanical vibration. In other words, as a result of the voltage being applied to the transducer elements 104, the transducer elements 104 are configured to mechanically vibrate. The ultrasound wave generated by the mechanical vibration is transmitted to the inside of the patient P, i.e., to the inside of the patient's body. In this situation, ultrasound waves having mutually-different transmission delay periods in correspondence with the transducer elements 104 are converged so as to propagate in a predetermined direction.

Further, under the control of the controlling circuit 170, the transmission circuit 111 has a function capable of instantaneously changing the transmission frequency, the transmission drive voltage, and the like for executing a predetermined scan sequence. In particular, the capability to change the transmission drive voltage is realized by a transmission circuit of a linear amplifier type capable of instantaneously switching the value of the transmission drive voltage or a mechanism configured to electrically switch between a plurality of power source units.

The reflected wave of the ultrasound wave transmitted by the ultrasound probe 101 reaches the transducer elements 104 provided inside the ultrasound probe 101 and is subsequently converted at the transducer elements 104 from mechanical vibration into an electrical signal (the reflected-wave signal) so as to be input to the reception circuit 112. The reception circuit 112 includes the amplifiers 106_1 and 106_2, an Analog-to-Digital (A/D) converter (not illustrated), a reception beam former (not illustrated), and the like and is configured to generate the reflected-wave data by performing various types of processes on the reflected-wave signal transmitted thereto from the ultrasound probe 101. The abovementioned reflected-wave signal and reflected-wave data are examples of the reception signals. The reception circuit 112 is configured to generate two-dimensional reflected-wave data from a two-dimensional reflected-wave signal transmitted thereto from the ultrasound probe 101. Further, the reception circuit 112 is configured to generate three-dimensional reflected-wave data from a three-dimensional reflected-wave signal transmitted thereto from the ultrasound probe 101. Further, the reception circuit 112 is configured to store the generated reflected-wave data into the buffer memory 120.

Each of the amplifiers 106_1 and 106_2 is configured to amplify the reflected-wave signal output from a corresponding one of the transducer element groups 104*a* or a corresponding one of the transducer element groups 104*b*. In this situation, the reflected-wave signal output from any one of the transducer element groups 104*a* or any one of the transducer element groups 104b is a reflected-wave signal (a reception signal) obtained by adding up (combining) the N reflected-wave signals output from the N transducer elements 104 included in the transducer element group 104a or the transducer element group 104b.

Further, the A/D converter is configured to convert the reflected-wave signal being the amplified signal in an analog format (an analog signal), into a reflected-wave signal in a digital format (a digital signal).

After that, the reception beam former is configured to generate first reflected-wave data by applying a reception delay to the N reflected-wave signals in the digital format resulting from the A/D conversion performed on the N reflected-wave signals in the analog format output from the N transducer element groups 104b and further adding up the N reflected-wave signals to which the reception delay was applied. In other words, the reception beam former is configured to generate the first reflected-wave data, by performing a beam forming process on the N digital-format reflected-wave signals based on the N analog-format reflected-wave signals output from the N transducer element groups 104b.

Also, the reception beam former is configured to generate second reflected-wave data by applying a reception delay to the N reflected-wave signals in the digital format resulting from the A/D conversion performed on the N reflected-wave signals in the analog format output from the N transducer element groups 104a and further adding up the N reflected-wave signals to which the reception delay was applied. In other words, the reception beam former is configured to generate the second reflected-wave data, by performing a beam forming process on the N digital-format reflected-wave signals based on the N analog-format reflected-wave signals output from the N transducer element groups 104a.

After that, the reception beam former is configured to store the generated reflected-wave data (the first reflected-wave data and the second reflected-wave data) into the buffer memory 120.

Next, an example of a method for generating the first reflected-wave data and the second reflected-wave data will be explained, with reference to FIGS. 9A to 9F and FIGS. 10A to 10F. FIGS. 9A to 9F are drawings for explaining an example of ultrasound transmission and reception at the time of obtaining the first reflected-wave data according to the first embodiment.

Figure 9A:
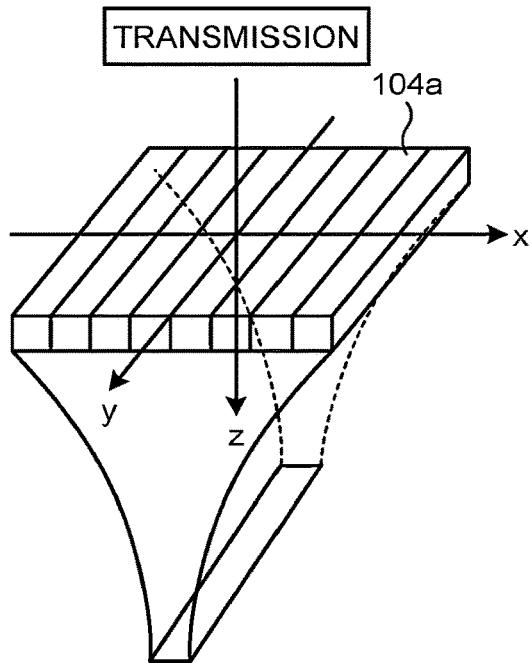
FIG. 9A is a drawing for explaining an example of ultrasound transmission and reception at the time of obtaining first reflected-wave data according to the first embodiment.
Figure 9B:
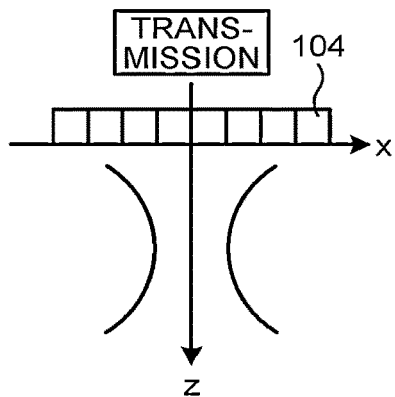
FIG. 9B is another drawing for explaining the example of the ultrasound transmission and reception at the time of obtaining the first reflected-wave data according to the first embodiment.
Figure 9C:
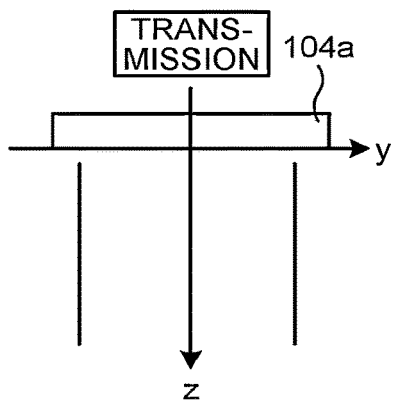
FIG. 9C is yet another drawing for explaining the example of the ultrasound transmission and reception at the time of obtaining the first reflected-wave data according to the first embodiment.

As illustrated in FIGS. 9A to 9C, when transmitting an ultrasound wave (a first ultrasound wave), the ultrasound diagnosis apparatus 1 is configured to apply a focus (a transmission focus) to the x-axis direction, but for the y-axis direction, to transmit a plane wave without applying a focus. For example, with respect to each of the transducer element groups 104a, the ultrasound diagnosis apparatus 1 is configured to perform the process of causing the N transducer elements 104 included in the transducer element group 104a to transmit an ultrasound wave to which a transmission delay is applied in the row direction (the x-axis direction). In other words, when transmitting the first ultrasound wave, the ultrasound diagnosis apparatus 1 is configured to cause each of the transducer element groups 104a including the plurality of transducer elements 104 that are arranged in the y-axis direction (the direction along one of the two axes) and are connected in common to one another to transmit the first ultrasound wave, the y-axis being one of the two axes (i.e., the x-axis and the y-axis) intersecting each other. The transducer element groups 104a serve as an example of the first transducer element group. The N transducer element groups 104a are arranged in the x-axis direction (the direction along the other of the two axes).

Figure 9D:
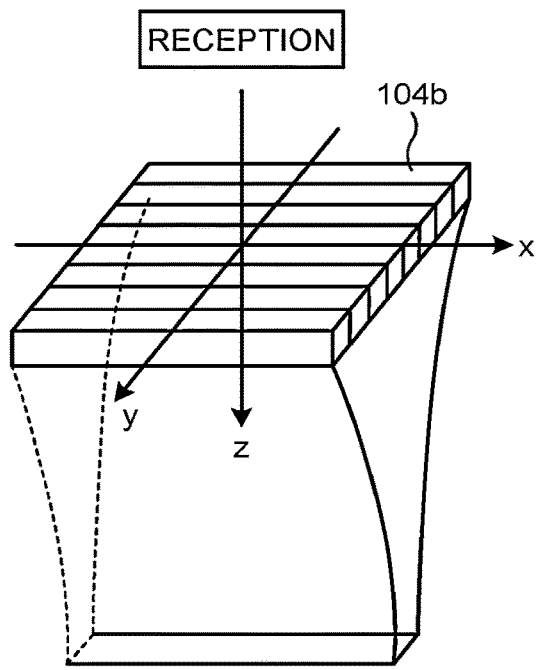
FIG. 9D is yet another drawing for explaining the example of the ultrasound transmission and reception at the time of obtaining the first reflected-wave data according to the first embodiment.
Figure 9E:
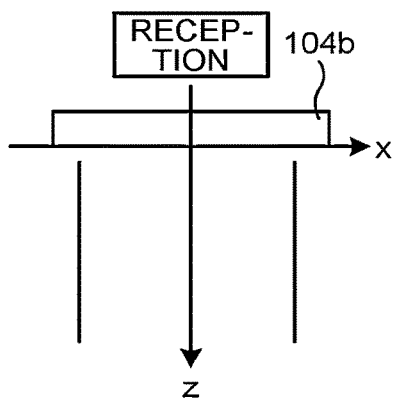
FIG. 9E is yet another drawing for explaining the example of the ultrasound transmission and reception at the time of obtaining the first reflected-wave data according to the first embodiment.
Figure 9F:
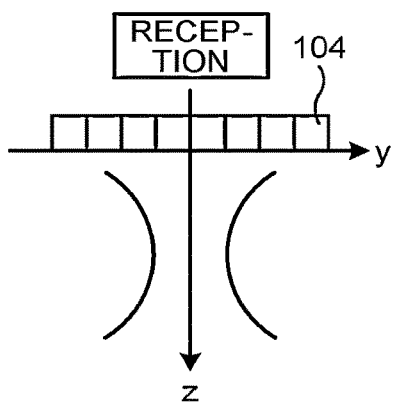
FIG. 9F is yet another drawing for explaining the example of the ultrasound transmission and reception at the time of obtaining the first reflected-wave data according to the first embodiment.

Further, as illustrated in FIGS. 9D to 9F, when receiving a reflected wave of the ultrasound wave (the first ultrasound wave), the ultrasound diagnosis apparatus 1 is configured to apply a focus (a reception focus) to the y-axis direction, but for the x-axis direction, to receive a plane wave without applying a focus. In other words, when receiving the reflected wave of the first ultrasound wave, the ultrasound diagnosis apparatus 1 is configured to cause each of the transducer element groups 104b including the plurality of transducer elements 104 that are arranged in the x-axis direction (the direction along the other of the two axes) and are connected in common to one another to receive the reflected wave of the first ultrasound wave, the x-axis being one of the two axes (i.e., the x-axis and the y-axis). The transducer element groups 104b serve as an example of the second transducer element group. The N transducer element groups 104b are arranged in the y-axis direction (the direction along the one of the two axes).

In that situation, the controlling circuit 170 is configured to input, to each of the multiplexers 107_1, a control signal for causing a drive signal to be output from the output terminal 107_1_c of the multiplexer 107_1, the drive signal having been supplied by the corresponding pulser 105_1 and having been input to the first input terminal 107_1_a of the multiplexer 107_1. Accordingly, each of the multiplexers 107_1 is configured to supply the drive signal supplied by the corresponding pulser 105_1 to the corresponding transducer elements 104.

Further, the controlling circuit 170 is configured to input, to each of the demultiplexers 107_2, a control signal for causing a reflected-wave signal to be output from the second output terminal 107_2_c of the demultiplexer 107_2 to the corresponding amplifier 106_2 connected to the second output terminal 107_2_c, the reflected-wave signal having been input to the input terminal 107_2_a of the demultiplexer 107_2 from the corresponding transducer elements 104. Accordingly, each of the demultiplexers 107_2 is configured to output the reflected-wave signal output from the corresponding transducer elements 104 to the corresponding amplifier 106_2.

In this manner, as a result of the ultrasound transmission and reception illustrated in FIGS. 9A to 9F, the N reflected-wave signals (the digital signals) based on the N reflected-wave signals (the analog signals) output from the N transducer element groups 104b are obtained, so that the N obtained reflected-wave signals are input to the reception beam former.

Further, as explained above, the reception beam former is configured to generate the first reflected-wave data by performing the beam forming process on the N obtained reflected-wave signals (the digital signals). A specific example of the beam forming process performed by the reception beam former will be explained.

The reception beam former is configured to perform an adaptive beam forming process to improve an azimuth resolution, on the N obtained reflected-wave signals (the digital signals). For example, the reception beam former performs a beam forming process by implementing a Minimum Variance (MV) method on the N obtained reflected-wave signals (the digital signals). The MV method is a method by which null is set with responses from unnecessary directions having high power, so as to reduce the responses from the unnecessary directions. In the following sections, an example of the beam forming process performed by the reception beam former while using the MV method will be explained. For example, the reception beam former is configured to calculate a weight coefficient $W_{MV}$ of the transducer elements 104 according to the MV method, by using Expression (1) presented below, where R denotes a covariance matrix.

$$w_{MV} = \frac{R^{-1}a}{a^H R^{-1} a} \quad (1)$$

In Expression (1), "a" denotes a steering vector in a desired direction. The reception beam former is configured to calculate the covariance matrix R by using a time average from "−k" to "k" and a subarray having the length "l", by using Expressions (2) and (3) presented below.

$$\bar{R}(z,x) = \frac{\sum_{j=-k}^{k} \sum_{k=0}^{n-l} \bar{r}_i^H(z-j,x)}{(2k+1)(n-l+1)} \quad (2)$$

$$\bar{r}_i(z,x) = [r_i(z,x), r_{i+1}(z,x), \ldots, r_{i+l-1}(z,x)]^T \quad (3)$$

In Expression (2), "n" denotes the quantity of the transducer elements 104, whereas "x" denotes the transducer element direction, while "z" denotes the depth direction. Further, the term on the left-hand side in Expression (3) denotes a reception signal vector in a position (z,x) in an i-th subarray.

Further, to guarantee that there is an inverse matrix of the covariance matrix R, the reception beam former adds noise to diagonal elements of the covariance matrix R, by using Expressions (4) and (5) presented below.

$$\hat{R}(z,x) = \bar{R}(z,x) + \epsilon I \quad (4)$$

$$\epsilon = \frac{\Delta}{l} \text{trace}(\bar{R}(z,x)) \quad (5)$$

In Expression (4), "I" denotes an identity matrix.

Further, the reception beam former is configured to calculate first reflected-wave data $s_{MV}$ as a result of the beam forming process, by using Expression (6) presented below.

$$s_{MV} = \frac{1}{n-l+1} \sum_{i=0}^{n-l} w_{MV}^H \bar{r}_i \quad (6)$$

By using the method described above, the reception beam former has generated the first reflected-wave data $s_{MV}$, by performing the beam forming process while implementing the MV method.

FIGS. 10A to 10F are drawings for explaining an example of ultrasound transmission and reception at the time of obtaining the second reflected-wave data according to the first embodiment.

Figure 10A:
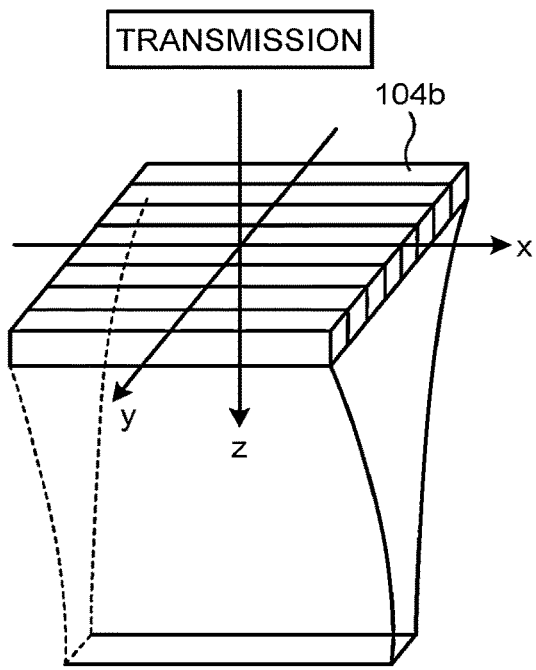
FIG. 10A is a drawing for explaining an example of ultrasound transmission and reception at the time of obtaining second reflected-wave data according to the first embodiment.
Figure 10B:
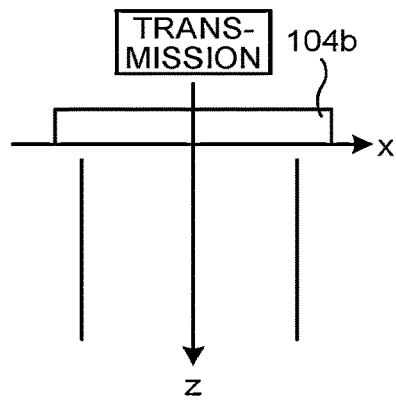
FIG. 10B is another drawing for explaining the example of the ultrasound transmission and reception at the time of obtaining the second reflected-wave data according to the first embodiment.
Figure 10C:
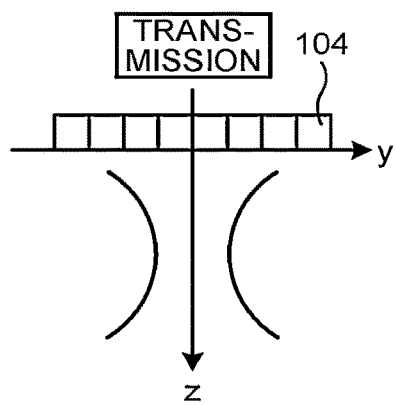
FIG. 10C is yet another drawing for explaining the example of the ultrasound transmission and reception at the time of obtaining the second reflected-wave data according to the first embodiment.

As illustrated in FIGS. 10A to 10C, when transmitting an ultrasound wave (a second ultrasound wave), the ultrasound diagnosis apparatus 1 is configured to apply a focus (a transmission focus) to the y-axis direction, but for the x-axis direction, to transmit a plane wave without applying a focus. For example, with respect to each of the transducer element groups 104b, the ultrasound diagnosis apparatus 1 is configured to perform the process of causing the N transducer elements 104 included in the transducer element group 104b to transmit an ultrasound wave to which a transmission delay is applied in the column direction (the y-axis direction). In other words, when transmitting the second ultrasound wave, the ultrasound diagnosis apparatus 1 is configured to cause each of the transducer element groups 104b to transmit the second ultrasound wave.

Figure 10D:
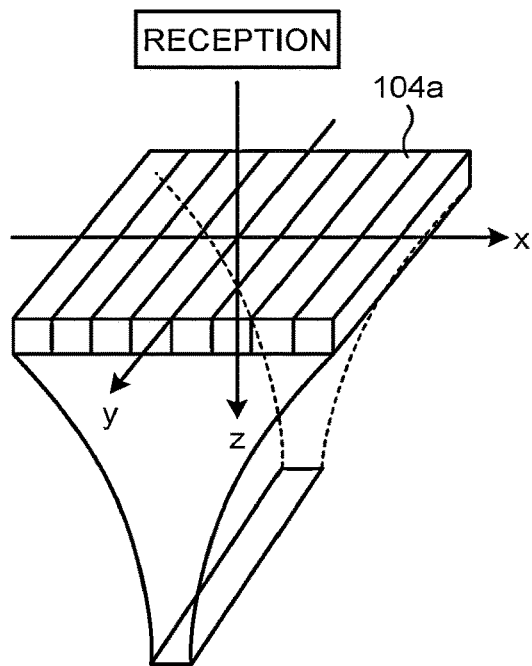
FIG. 10D is yet another drawing for explaining the example of the ultrasound transmission and reception at the time of obtaining the second reflected-wave data according to the first embodiment.
Figure 10E:
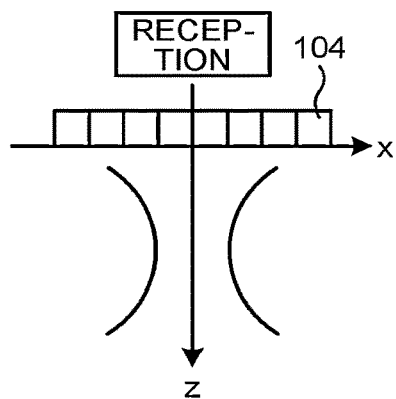
FIG. 10E is yet another drawing for explaining the example of the ultrasound transmission and reception at the time of obtaining the second reflected-wave data according to the first embodiment.
Figure 10F:
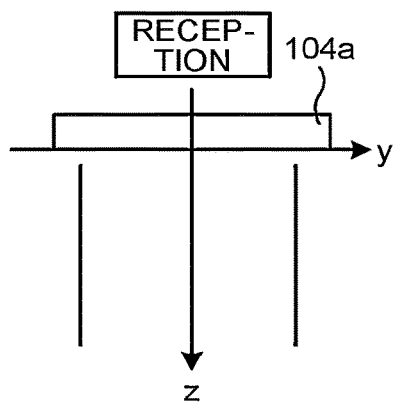
FIG. 10F is yet another drawing for explaining the example of the ultrasound transmission and reception at the time of obtaining the second reflected-wave data according to the first embodiment.

After that, as illustrated in FIGS. 10D to 10F, when receiving a reflected wave of the ultrasound wave (the second ultrasound wave), the ultrasound diagnosis apparatus 1 is configured to apply a focus (a reception focus) to the x-axis direction, but for the y-axis direction, to receive a plane wave without applying a focus. In other words, when receiving the reflected wave of the second ultrasound wave, the ultrasound diagnosis apparatus 1 is configured to cause each of the transducer element groups 104a to receive the reflected wave of the second ultrasound wave.

The plurality of transducer elements 104 arranged two-dimensionally according to the present embodiment are a plurality of Row-Column Addressing (RCA) transducer elements capable of performing the operation described above.

In this situation, the controlling circuit 170 is configured to input, to each of the multiplexers 107_1, a control signal for causing a drive signal to be output from the output terminal 107_1_c of the multiplexer 107_1, the drive signal having been supplied by the corresponding pulser 105_2 and having been input to the second input terminal 107_1_b of the multiplexer 107_1. Accordingly, each of the multiplexers 107_1 is configured to supply the drive signal supplied by the corresponding pulser 105_2 to the corresponding transducer elements 104.

Further, the controlling circuit 170 is configured to input, to each of the demultiplexers 107_2, a control signal for causing a reflected-wave signal to be output from the first output terminal 107_2_b of the demultiplexer 107_2 to the corresponding amplifier 106_1 connected to the first output terminal 107_2_b, the reflected-wave signal having been input to the input terminal 107_2_a of the demultiplexer 107_2 from the corresponding transducer elements 104. Accordingly, each of the demultiplexers 107_2 is configured to output the reflected-wave signal output from the corresponding transducer elements 104 to the corresponding amplifier 106_1.

In this manner, as a result of the ultrasound transmission and reception illustrated in FIGS. 10A to 10F, the N reflected-wave signals (the digital signals) based on the N reflected-wave signals (the analog signals) output from the N transducer element groups 104a are obtained, so that the N obtained reflected-wave signals are input to the reception beam former.

Further, by using the same method as the method for generating the first reflected-wave data described above, the reception beam former is configured to generate the second reflected-wave data. In this situation, although the example was explained in which the reception beam former performs the beam forming process by using the MV method, the beam forming process used by the reception beam former may be of any type as long as the beam forming process is an adaptive beam forming process with which ultrasound image data close to that of focus transmission is obtained through plane wave transmission. For example, the reception beam former may perform a beam forming process by implementing an Amplitude and Phase Estimation (APES) method, a Coherence Factor (FC) method, or a Sign Coherence (SCF) method. Further, the reception beam former may perform a beam forming process by using a method modified from one of these methods. For example, the reception beam former may perform a beam forming process by using an advanced form of the CF method such as a united sign coherence factor method. Furthermore, the reception beam former may perform a beam forming process by using a method of inverse problem solving or the like or a method based on deep learning.

The buffer memory 120 is a memory configured to temporarily store therein the reflected-wave data generated by the transmission and reception circuit 110. For example, the buffer memory 120 is configured so as to be able to store therein reflected-wave data corresponding to a predetermined number of frames. Further, while having stored therein the reflected-wave data corresponding to the predetermined number of frames, when reflected-wave data corresponding to one frame is newly generated by the reception circuit 112, the buffer memory 120 is configured, under control of the reception circuit 112, to discard the reflected-wave data corresponding to one frame generated earliest and to store therein the newly-generated reflected-wave data corresponding to the one frame. For example, the buffer memory 120 is realized by using a semiconductor memory element such as a Random Access Memory (RAM) or a flash memory.

The signal processing circuitry 130 is configured to read the first reflected-wave data and the second reflected-wave data from the buffer memory 120. Further, the signal processing circuitry 130 is configured to add the read second reflected-wave data to the read first reflected-wave data, to further perform various types of signal processing processes on data obtained from the addition (the data resulting from the addition), and to output the data resulting from the addition on which the various types of signal processing processes were performed to the image generating circuit 140 as B-mode data or Doppler data. For example, the signal processing circuitry 130 is realized by using a processor. The signal processing circuitry 130 is an example of a signal processing unit.

FIG. 11 is a flowchart illustrating a flow in an example of processes from when the reception circuit 112 and the signal processing circuitry 130 according to the first embodiment generate the first reflected-wave data and the second reflected-wave data to when the data resulting from the addition is obtained.

As illustrated in FIG. 1, the reception circuit 112 generates the first reflected-wave data and stores the first reflected-wave data into the buffer memory 120 (step S101). Further, the reception circuit 112 generates the second reflected-wave data and stores the second reflected-wave data into the buffer memory 120 (step S102).

After that, the signal processing circuitry 130 reads the first reflected-wave data and the second reflected-wave data from the buffer memory 120 and adds the second reflected-wave data to the first reflected-wave data (step S103) and thus ends the processes presented in FIG. 11.

The acoustic field of the ultrasound transmission and reception illustrated in FIGS. 9A to 9F referenced above may be expressed as $sinc(x)sinc^2(y)$, for example. In contrast, the acoustic field of the ultrasound transmission and reception illustrated in FIGS. 10A to 10F referenced above may be expressed as $sinc^2(x)sinc(y)$, for example. Accordingly, the acoustic field obtained when the second reflected-wave data is added to the first reflected-wave data may be expressed as $sinc(x)sinc(y)(sinc(x)+sinc(y))$. For the ultrasound diagnosis apparatus 300 including the transducer element groups having the conventional RCA structure, the acoustic field of the ultrasound transmission and reception is expressed as $sinc(x)sinc(y)$ as explained above. Consequently, the ultrasound diagnosis apparatus 1 according to the first embodiment is able to improve directionality by $(sinc(x)+sinc(y))$ times in comparison to the ultrasound diagnosis apparatus 300.

Figure 12A:
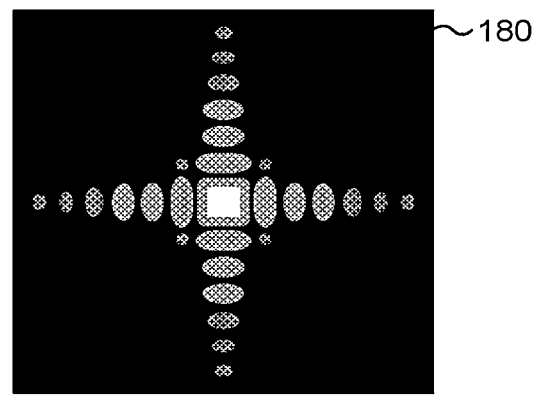
FIG. 12A presents an image depicting the range from the peak to −30 dB regarding a contour line chart at 6-dB intervals expressing a PSF of the ultrasound diagnosis apparatus including transducer element groups having an RCA structure as viewed from the z-axis direction.
Figure 12B:
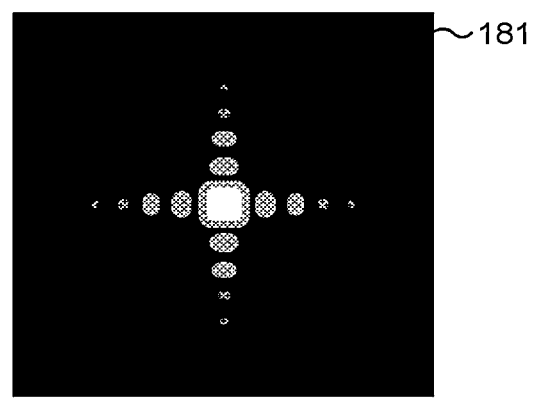
FIG. 12B presents an image depicting the range from the peak to −30 dB regarding a contour line chart at 6-dB intervals expressing a PSF of the ultrasound diagnosis apparatus according to the first embodiment as viewed from the z-axis direction.
Figure 12C:
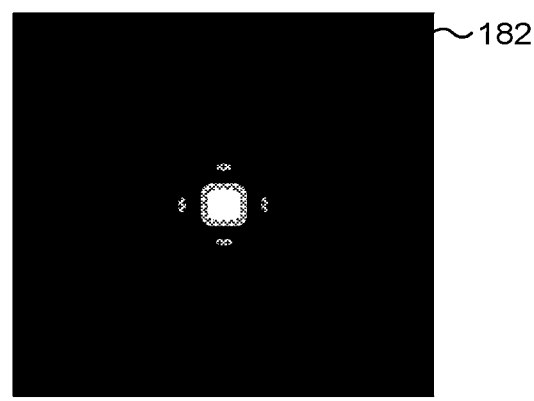
FIG. 12C presents an image depicting the range from the peak to −30 dB regarding a contour line chart at 6-dB intervals expressing a PSF of the ultrasound diagnosis apparatus based on the 2DA scheme, as viewed from the z-axis direction.

FIG. 12A presents an image 180 depicting the range from the peak to −30 dB regarding a contour line chart at 6-dB intervals expressing a PSF of the ultrasound diagnosis apparatus 300 including the transducer element groups having the RCA structure as viewed from the z-axis direction. FIG. 12B presents an image 181 depicting the range from the peak to −30 dB regarding a contour line chart at 6-dB intervals expressing a PSF of the ultrasound diagnosis apparatus 1 according to the first embodiment as viewed from the z-axis direction. FIG. 12C presents an image 182 depicting the range from the peak to −30 dB regarding a contour line chart at 6-dB intervals expressing a PSF of the ultrasound diagnosis apparatus 200 based on the 2DA scheme, as viewed from the z-axis direction.

As understood when the image 180 is compared with the image 181, when the ultrasound diagnosis apparatus 1 according to the first embodiment is used, sidelobes are significantly reduced, compared to the example with the conventional ultrasound diagnosis apparatus 300. Further, as understood when the image 181 is compared with the image 182, by using the ultrasound diagnosis apparatus 1 according to the first embodiment, it is possible to make the image quality close to that of the image data generated by the ultrasound diagnosis apparatus 200 based on the 2DA scheme. Consequently, by using the ultrasound diagnosis apparatus 1 according to the first embodiment, it is possible to improve the image quality of the ultrasound image obtained by using the transducer element groups having the RCA structure.

As described above, the signal processing circuitry 130 is configured to generate the B-mode data or the Doppler data by performing the various types of signal processing processes on the post-addition data resulting from the addition. For example, every time first reflected-wave data and second reflected-wave data corresponding to one frame are newly stored in the buffer memory 120, the signal processing circuitry 130 is configured to read the first reflected-wave data and the second reflected-wave data that correspond to the one frame and were newly stored in the buffer memory 120. Further, every time first reflected-wave data and second reflected-wave data corresponding to one frame are read, the signal processing circuitry 130 is configured to generate data corresponding to the one frame and resulting from addition, by adding the second reflected-wave data to the first reflected-wave data. Further, every time data corresponding to one frame and resulting from the addition is generated, the signal processing circuitry 130 is configured to newly generate B-mode data or Doppler data corresponding to the one frame, by performing the various types of signal processing processes on the data resulting from the addition. Further, every time B-mode data or Doppler data corresponding to one frame is generated, the signal processing circuitry 130 is configured to output the newly-generated B-mode data or Doppler data corresponding to the one frame, to the image generating circuit 140. Next, examples of the various types of signal processing processes performed by the signal processing circuitry 130 will be explained.

For example, the signal processing circuitry 130 is configured to generate B-mode data in which signal intensities (amplitude intensities) corresponding to sampling points are expressed as levels of brightness, by performing a quadrature detection and performing a logarithmic amplification process and an envelope detecting process, or the like on the data resulting from the addition. After that, the signal processing circuitry 130 is configured to output the generated B-mode data to the image generating circuit 140.

Further, the signal processing circuitry 130 is configured to perform a signal processing process on the data resulting from the addition, so as to realize harmonic imaging by which a higher harmonic component is visualized in an image. Examples of the harmonic imaging include Contrast Harmonic Imaging (CHI) and Tissue Harmonic Imaging (THI). Further, for the contrast harmonic imaging and the tissue harmonic imaging, scanning methods as follows are known. Examples of the known scanning methods include: Amplitude Modulation (AM) methods, Phase Modulation (PM) methods called a pulse subtraction method and a pulse inversion method, and AMPM methods in which advantageous effects of both the AM and the PM methods are achieved by combining the AM and the PM methods together.

Further, the signal processing circuitry 130 is configured to extract movement information of moving members (a blood flow, a tissue, a contrast agent echo component, etc.) based on the Doppler effect from the data resulting from the addition, by performing a frequency analysis on the data resulting from the addition and to generate Doppler data indicating the extracted movement information. For example, the signal processing circuitry 130 is configured to generate the Doppler data indicating the extracted movement information of the moving members, by extracting, as the movement information of the moving members, an average velocity value, an average dispersion value, an average power value, and the like with respect to multiple points. The signal processing circuitry 130 is configured to output the generated Doppler data to the image generating circuit 140.

By using the functions of the signal processing circuitry 130 described above, the ultrasound diagnosis apparatus 1 according to the embodiment is capable of implementing a color Doppler method which may be called a Color Flow Mapping (CFM) method. According to the color flow mapping method, ultrasound wave transmission and reception is performed multiple times on a plurality of scanning lines. Further, according to the color flow mapping method, a signal (a blood flow signal) derived from a blood flow is extracted from a data sequence corresponding to mutually the same position, while suppressing signals (clutter signals) derived from stationary tissues or slow-moving tissues, by applying a Moving Target Indicator (MTI) filter to the data sequence corresponding to mutually the same position. Further, according to the color flow mapping method, blood flow information such as velocity of the blood flow, dispersion of the blood flow, power of the blood flow, and the like are estimated on the basis of the blood flow signal. The signal processing circuitry 130 is configured to output color image data indicating the blood flow information estimated by implementing the color flow mapping method, to the image generating circuit 140. The color image data is an example of Doppler data.

The signal processing circuitry 130 is capable of processing both two-dimensional data resulting from the addition and three-dimensional data resulting from the addition.

The image generating circuit 140 is configured to generate ultrasound image data from the B-mode data or the Doppler data output from the signal processing circuitry 130. The image generating circuit 140 is realized by using a processor.

For example, the image generating circuit 140 is configured to generate two-dimensional B-mode image data in which the intensities of the reflected wave are expressed with brightness levels, from two-dimensional B-mode data generated by the signal processing circuitry 130. Further, the image generating circuit 140 is configured to generate two-dimensional Doppler image data in which the movement information or the blood flow information is visualized in an image, from two-dimensional Doppler data generated by the signal processing circuitry 130. In this situation, the two-dimensional Doppler image data obtained by visualizing the movement information in the image is velocity image data, dispersion image data, power image data, or image data combining together these types of image data.

In this situation, generally speaking, the image generating circuit 140 is configured to convert (by performing a scan convert process) a scanning line signal sequence from an ultrasound scan into a scanning line signal sequence in a video format used by television, for example, and to generate display-purpose ultrasound image data. For example, the image generating circuit 140 is configured to generate the display-purpose ultrasound image data by performing a coordinate transformation process compliant with the ultrasound scanning mode used by the ultrasound probe 101 on the data output from the signal processing circuitry 130. Further, as various types of image processing processes besides the scan convert process, the image generating circuit 140 is configured to perform, for example, an image processing process (a smoothing process) to re-generate an average brightness value image, an image processing process (an edge enhancement process) that uses a differential filter inside an image, or the like, by using a plurality of image frames resulting from the scan convert process. Also, the image generating circuit 140 is configured to combine text information of various types of parameters, scale graduations, body marks, and the like with the ultrasound image data.

Further, the image generating circuit 140 is configured to generate three-dimensional B-mode image data by performing a coordinate transformation process on three-dimensional B-mode data generated by the signal processing circuitry 130. Further, the image generating circuit 140 is configured to generate three-dimensional Doppler image data by performing a coordinate transformation process on three-dimensional Doppler data generated by the signal processing circuitry 130. In other words, the image generating circuit 140 is configured to generate the "three-dimensional B-mode image data and three-dimensional Doppler image data" as "three-dimensional ultrasound image data (volume data)". Further, the image generating circuit 140 is configured to perform various types of rendering processes on the volume data, so as to generate various types of two-dimensional image data used for displaying the volume data on the display 103.

Examples of the rendering processes performed by the image generating circuit 140 include a process of generating Multi Planar Reconstruction (MPR) image data from the volume data by using a Multi Planar Reconstruction (MPR) method. Further, other examples of the rendering processes performed by the image generating circuit 140 include a Volume Rendering (VR) process by which two-dimensional image data reflecting three-dimensional information is generated. The image generating circuit 140 is an example of an image generating unit.

The B-mode data and the Doppler data are each ultrasound image data before the scan convert process. The data generated by the image generating circuit 140 is the display-purpose ultrasound image data after the scan convert process. The B-mode data and the Doppler data may be referred to as raw data.

As explained above, in the first embodiment, the reception circuit 112, the signal processing circuitry 130, and the image generating circuit 140 are configured to generate the ultrasound image data on the basis of the reflected-wave signals obtained by the ultrasound probe 101. For example, the reception circuit 112, the signal processing circuitry 130, and the image generating circuit 140 are configured to generate ultrasound image data on the basis of the reflected-wave signal (the first reception signal) obtained by causing the transducer element groups 104b to receive the reflected wave of the first ultrasound wave and the reflected-wave signal (the second reception signal) obtained by causing the transducer element groups 104a to receive the reflected wave of the second ultrasound wave.

Further, the reception circuit 112, the signal processing circuitry 130, and the image generating circuit 140 are configured to generate ultrasound image data on the basis of data (a fifth reception signal) resulting from the addition to add up the first reflected-wave data (a third reception signal) obtained by performing the beam forming process on the plurality of first reception signals output from the plurality of (N) transducer element groups 104b and the second reflected-wave data (a fourth reception signal) obtained by performing the beam forming process on the plurality of second reception signals output from the plurality of (N) transducer element groups 104a. The reception circuit 112, the signal processing circuitry 130, and the image generating circuit 140 are examples of a generating unit.

The image memory 150 is a memory configured to store therein various types of image data generated by the image generating circuit 140. Further, the image memory 150 is also configured to store therein the data generated by the signal processing circuitry 130. An operator is able to invoke the B-mode data and the Doppler data stored in the image memory 150 after a diagnosis process, for example. The invoked data serves as display-purpose ultrasound image data after being routed through the image generating circuit 140. For example, the image memory 150 is realized by using a semiconductor memory element such as a RAM or a flash memory, or a hard disk, an optical disk, or the like.

The storage circuit 160 is configured to store therein control programs for performing the scan (transmitting and receiving ultrasound waves), image processing processes, and display processes, as well as various types of data such as diagnosis information (e.g., patient IDs, medical doctors' observations, etc.), diagnosis protocols, and various types of body marks. Further, the storage circuit 160 may also be used for saving any of the data stored in the image memory 150, as necessary. For example, the storage circuit 160 is realized by using a semiconductor memory element such as a flash memory, or a hard disk, an optical disk, or the like. The storage circuit 160 is an example of a storage unit.

The controlling circuit 170 is configured to control the entirety of the processes performed by the ultrasound diagnosis apparatus 1. More specifically, the controlling circuit 170 is configured to control processes performed by the transmission and reception circuit 110, the signal processing circuitry 130, and the image generating circuit 140, on the basis of the various types of setting requests input by the operator via the input apparatus 102 and the various types of control programs and various types of data read from the storage circuit 160. Further, the controlling circuit 170 is configured to control the display 103 so as to display ultrasound images based on the display-purpose ultrasound image data stored in the image memory 150. For example, the controlling circuit 170 is configured to control the display 103 so as to display a B-mode image based on B-mode image data or a color image based on color image data. Further, the controlling circuit 170 is configured to control the display 103 so as to display a color image superimposed on a B-mode image. The controlling circuit 170 is an example of a display controlling unit or a controlling unit. For example, the controlling circuit 170 is realized by using a processor. The ultrasound images are examples of images.

Further, the controlling circuit 170 is configured to control the ultrasound scan by controlling the ultrasound probe 101 via the transmission and reception circuit 110.

The term "processor" used in the above explanations denotes, for example, a Central Processing Unit (CPU), a Graphics Processing Unit (GPU), or a circuit such as an Application Specific Integrated Circuit (ASIC) or a programmable logic device (e.g., a Simple Programmable Logic Device (SPLD), a Complex Programmable Logic Device (CPLD), or a Field Programmable Gate Array (FPGA)). One or more processors are configured to realize the functions by reading the programs saved in the storage circuit 160 and executing the read programs. Alternatively, instead of having the programs saved in the storage circuit 160, it is also acceptable to directly incorporate the programs into the circuits of the one or more processors. In that situation, the one or more processors are configured to realize the functions by reading and executing the programs incorporated in the circuits thereof. Further, the processors according to the present embodiment do not each necessarily have to be structured as a single circuit. It is also acceptable to structure one processor by combining together a plurality of independent circuits, so as to realize the functions thereof. Further, two or more of the circuits (e.g., the transmission and reception circuit 110, the signal processing circuitry 130, the image generating circuit 140, and the controlling circuit 170) illustrated in FIG. 7 may be integrated in a single processor so as to realize the functions thereof. In other words, the transmission and reception circuit 110, the signal processing circuitry 130, the image generating circuit 140, and the controlling circuit 170 may be integrated into one piece of processing circuitry realized with a processor.

The ultrasound diagnosis apparatus 1 according to the first embodiment has thus been explained. As explained above, by using the ultrasound diagnosis apparatus 1 according to the first embodiment, it is possible to improve the image quality of the ultrasound images obtained by using the transducer element groups having the RCA structure.

Second Embodiment

In the first embodiment, the example was explained in which the ultrasound diagnosis apparatus 1 is configured to add up the two pieces of reflected-wave data obtained by performing the beam forming process separately on each of the two reflected-wave signals resulting from the ultrasound transmission and reception performed twice. However, the ultrasound diagnosis apparatus 1 may also be configured to collectively perform a beam forming process once on the two reflected-wave signals resulting from the ultrasound transmission and reception performed twice. Thus, this embodiment will be explained as a second embodiment. In the description of the second embodiment, differences from the first embodiment will primarily be explained. Explanations of some of the elements that are the same as those in the first embodiment may be omitted.

In the second embodiment, a reception beam former is configured to expand the MV method into two dimensions. In the second embodiment, to simplify the explanations, an example having no subarrays, i.e., where 1=n is true will be explained. In the second embodiment, to Expression (2), the reception beam former applies 1=n. Further, by using Expression (7) presented below, the reception beam former performs the beam forming process by using Expressions (4) to (6) similarly to the first embodiment.

$$\bar{r}_0(z, x) = \begin{pmatrix} u \\ v \end{pmatrix} \quad (7)$$

Figure 6A:
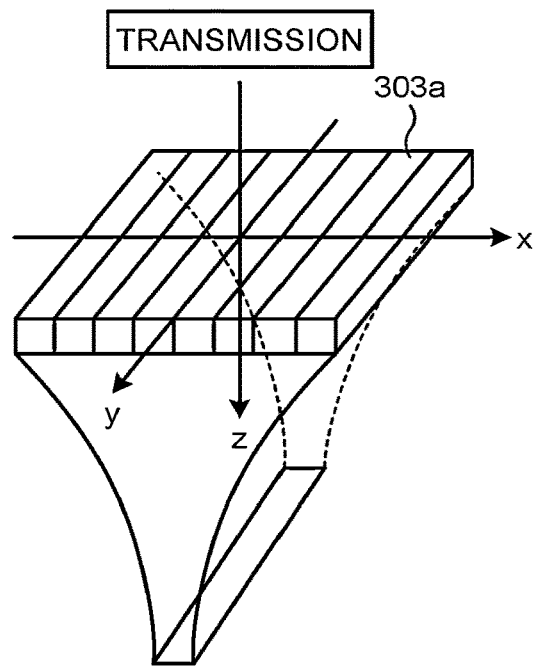
FIG. 6A is a drawing for explaining an example of a mode of ultrasound transmission and reception performed by the conventional ultrasound diagnosis apparatus.
Figure 6B:
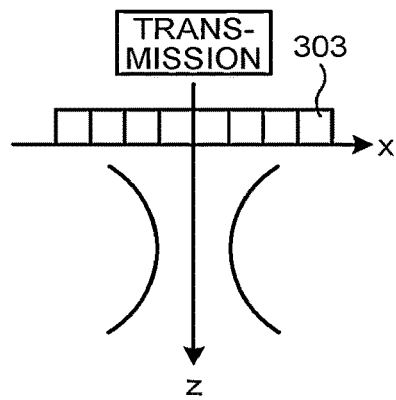
FIG. 6B is another drawing for explaining the example of the mode of the ultrasound transmission and reception performed by the conventional ultrasound diagnosis apparatus.
Figure 6C:
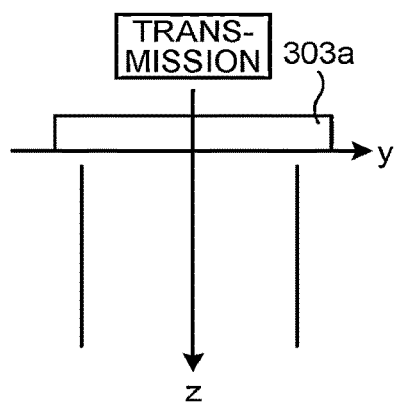
FIG. 6C is yet another drawing for explaining the example of the mode of the ultrasound transmission and reception performed by the conventional ultrasound diagnosis apparatus.
Figure 6D:
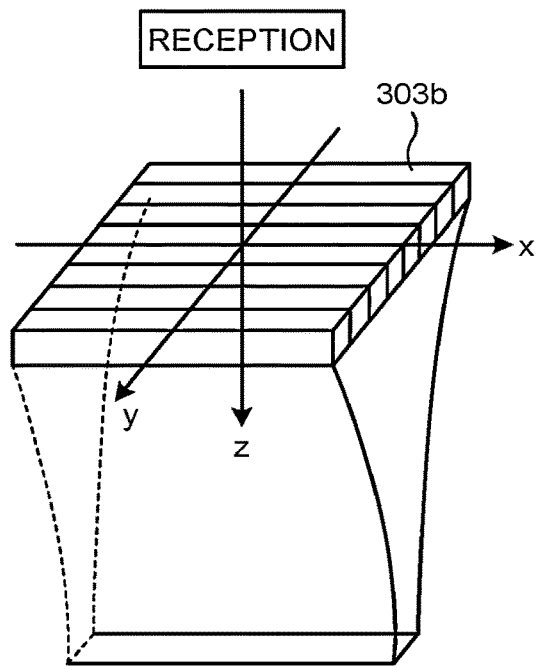
FIG. 6D is yet another drawing for explaining the example of the mode of the ultrasound transmission and reception performed by the conventional ultrasound diagnosis apparatus.
Figure 6E:
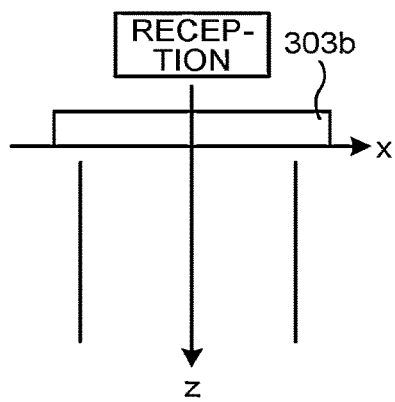
FIG. 6E is yet another drawing for explaining the example of the mode of the ultrasound transmission and reception performed by the conventional ultrasound diagnosis apparatus.
Figure 6F:
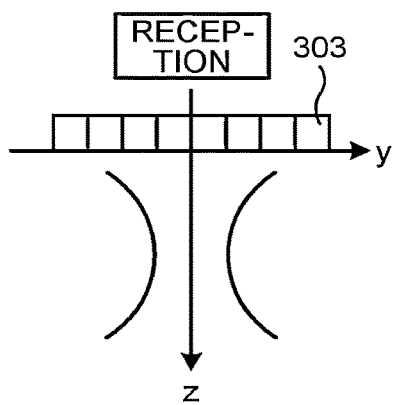
FIG. 6F is yet another drawing for explaining the example of the mode of the ultrasound transmission and reception performed by the conventional ultrasound diagnosis apparatus.

In Expression (7), "u" denotes a reception signal vector (a reflected-wave signal vector) obtained by receiving a reflected wave of the first ultrasound wave illustrated in FIGS. 6D to 6F. Further, "v" denotes a reception signal vector (a reflected-wave signal vector) obtained by receiving a reflected wave of the second ultrasound wave illustrated in FIGS. 9D to 9F. In Expression (7), "u" and "v" are connected to form one vector. In the second embodiment, the signal (reflected-wave data) $s_{MV}$ obtained from Expression (6) is a result of collectively performing the beam forming process once by implementing the MV method on the two reflected-wave signals.

In other words, the reception circuit 112, the signal processing circuitry 130, and the image generating circuit 140 are configured to generate ultrasound image data on the basis of the reflected-wave data $s_{MV}$ obtained by combining the plurality of reflected-wave signals (the first reception signals) output from the plurality of transducer element groups 104b, with the plurality of reflected-wave signals (the second reception signals) output from the plurality of transducer element groups 104a and further performing the beam forming process on the plurality of first reception signals and the plurality of second reception signals. The reflected-wave data $s_{MV}$ is an example of the third reception signal.

The ultrasound diagnosis apparatus 1 according to the second embodiment has thus been explained. The ultrasound diagnosis apparatus 1 according to the second embodiment is able to achieve advantageous effects similar to those achieved by the ultrasound diagnosis apparatus 1 according to the first embodiment.

Third Embodiment

The ultrasound diagnosis apparatus 1 may be configured to estimate signals (reflected-wave data) obtained from the beam forming process, by employing a trained model. Thus, this embodiment will be explained as a third embodiment. In the description of the third embodiment, differences from the first embodiment will primarily be explained. Explanations of some of the elements that are the same as those in the first embodiment may be omitted.

Figure 13:
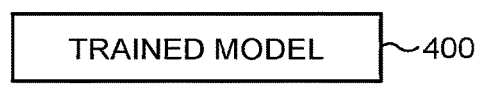
FIG. 13 is a drawing illustrating an example of a trained model according to a third embodiment.

FIG. 13 is a drawing illustrating an example of a trained model 400 according to the third embodiment. In the third embodiment, the storage circuit 160 has stored therein the trained model 400 illustrated in FIG. 13. Further, the reception beam former is configured to obtain the trained model 400 from the storage circuit 160 and to estimate the signals (the reflected-wave data) to be obtained from the beam forming process, by using the obtained trained model 400.

Figure 14:
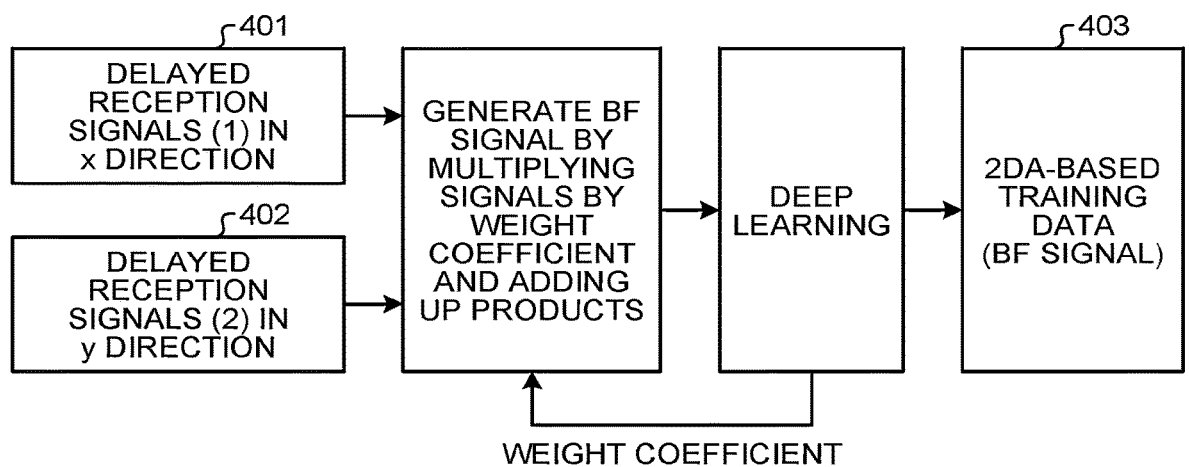
FIG. 14 is a drawing for explaining an example of a method for generating the trained model according to the third embodiment.

The trained model 400 is generated through training based on machine training. An example of a method for generating the trained model 400 is illustrated in FIG. 14. FIG. 14 is a drawing for explaining the example of the method for generating the trained model 400 according to the third embodiment. In the present example, for instance, a situation in which an external apparatus generates the trained model 400 will be explained. In response to receiving an input of delayed reception signals 401 in the x direction (see FIG. 14) and delayed reception signals 402 in the y direction (see FIG. 14), the trained model 400 is configured to output a result of multiplying a signal from each of the elements by a weight and further adding up the products, as a beam forming result. In this situation, the delayed reception signals 401 in the x direction may be, for example, a plurality of delayed reflected-wave signals (the first reception signals) output from the plurality of (N) transducer element groups 104a, whereas the delayed reception signals 402 in the y direction may be, for example, a plurality of delayed reflected-wave signals (the second reception signals) output from the plurality of (N) transducer element groups 104b. The trained model 400 is configured, in this manner, to generate a post-beam-forming first signal by calculating the weighted addition on the delayed reception signals 401 in the x direction and the delayed reception signals 402 in the y direction and to further output the generated post-beam-forming first signal.

In this situation, as illustrated in FIG. 14, the external apparatus is configured to cause the trained model 400 to learn an optimal weight, by calculating the optimal weight through deep learning that makes the first signal output from the trained model 400 closer to training data 403 based on a 2DA scheme (i.e., that approximates the first signal to the 2DA-based training data 403). In this situation, the 2DA-based training data 403 may be, for example, a post-beam-forming second signal obtained by the 2DA-based ultrasound diagnosis apparatus 200 and used as training data. The external apparatus may be configured to generate the delayed reception signals 401 in the x direction, the delayed reception signals 402 in the y direction, and the 2DA-based training data 403 by using, for example, an ultrasound simulator such as "Field II". Alternatively, the external apparatus may use actual data obtained from an actual RCA probe and an actual 2DA probe.

For example, the trained model 400 generated by the external apparatus is stored into the storage circuit 160. In this situation, for example, the external apparatus generates the trained model 400, by learning the relationship between the set made up of the delayed reception signals 401 in the x direction and the delayed reception signals 402 in the y direction and the 2DA-based training data 403.

As explained above, the external apparatus is configured to generate the trained model 400, by learning the set made up of the delayed reception signals 401 in the x direction and the delayed reception signals 402 in the y direction in correspondence with the 2DA-based training data 403.

For example, the external apparatus may be configured to carry out machine training by inputting, to a machine training engine, the set made up of the delayed reception signals 401 in the x direction and the delayed reception signals 402 in the y direction as input data and the 2DA-based training data 403 as training data. For example, the machine training engine carries out the machine training by using any of various types of algorithms such as deep learning, a neural network, a logistic regression analysis, a non-linear discriminant analysis, a Support Vector Machine (SVM), random forest, naive Bays, or the like.

The external apparatus is configured to generate the trained model 400 as a result of the machine training described above. In response to receiving an input of a signal corresponding to a set made up of delayed reception signals 401 in the x direction and delayed reception signals 402 in the y direction, the trained model 400 is configured to estimate (generate) and output a signal corresponding to the 2DA-based training data 403.

Further, at the time of speculation to speculate the signal corresponding to the 2DA-based training data 403, the reception beam former is configured to obtain the trained model 400 from the storage circuit 160. After that, the reception beam former is configured to input the set made up of the delayed reception signals 401 in the x direction and the delayed reception signals 402 in the y direction to the obtained trained model 400 and to thus obtain the signal corresponding to the 2DA-based training data 403 and being output from the trained model 400. Subsequently, the reception beam former is configured to store the obtained signal corresponding to the 2DA-based training data 403 into the buffer memory 120.

After that, the signal processing circuitry 130 is configured to read the signal corresponding to the 2DA-based training data 403 and having been stored in the buffer memory 120, to perform various types of signal processing processes on the read signal corresponding to the 2DA-based training data 403, and to output the signal corresponding to the 2DA-based training data 403 resulting from the various types of signal processing processes, to the image generating circuit 140, as B-mode data or Doppler data.

The ultrasound diagnosis apparatus 1 according to the third embodiment has thus been explained. In the third embodiment, the storage circuit 160 has stored therein the trained model 400 configured, in response to receiving the input of the set made up of the delayed reception signals 401 in the x direction and the delayed reception signals 402 in the y direction, to output the signal corresponding to the post-beam-forming second signal obtained by performing the beam forming process on the plurality of reflected-wave signals (the reception signals) output from the plurality of transducer elements 203 arranged two-dimensionally.

Further, in the third embodiment, the reception circuit 112, the signal processing circuitry 130, and the image generating circuit 140 are configured to generate the set made up of the delayed reception signals 401 in the x direction and the delayed reception signals 402 in the y direction. Subsequently, the reception circuit 112, the signal processing circuitry 130, and the image generating circuit 140 are configured to input the generated set made up of the delayed reception signals 401 in the x direction and the delayed reception signals 402 in the y direction to the trained model 400 and to thus obtain the signal corresponding to the 2DA-based training data 403 and being output from the trained model 400. Further, the reception circuit 112, the signal processing circuitry 130, and the image generating circuit 140 are configured to generate the ultrasound image data on the basis of the obtained signal corresponding to the 2DA-based training data 403.

The ultrasound diagnosis apparatus 1 according to the third embodiment is able to achieve advantageous effects similar to those achieved by the ultrasound diagnosis apparatus 1 according to the first embodiment.

In relation to the above, the programs executed by the one or more processors are provided as being incorporated, in advance, into a Read-Only Memory (ROM), a storage circuit, or the like. Alternatively, the programs may be provided as being recorded on a non-transitory computer-readable storage medium such as a Compact Disk Read-Only Memory (CD-ROM), a Flexible Disk (FD), a Compact Disk Recordable (CD-R), a Digital Versatile Disk (DVD), or the like, in a file in a format that is either installable or executable for these apparatuses. Further, the programs may be stored in a computer connected to a network such as the Internet, so as to be provided or distributed as being downloaded via the network. For example, the programs may be structured with modules including the processing functions described above. In the actual hardware, as a result of a CPU reading and executing the programs from a storage medium such as a ROM, the modules are loaded into a main storage apparatus so as to be generated in the main storage apparatus.

According to at least one aspect of the embodiments described above, it is possible to improve the image quality of the ultrasound image obtained by using the transducer element groups having the RCA structure.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An ultrasound diagnosis apparatus, comprising:
an ultrasound probe including a plurality of transducer elements arranged two-dimensionally; and
processing circuitry configured to generate ultrasound image data based on reception signals obtained by the ultrasound probe and to cause a display to display an ultrasound image based on the ultrasound image data, wherein
the plurality of transducer elements are a plurality of Row-Column Addressing transducer elements configured so that
when a first ultrasound wave is to be transmitted, the first ultrasound wave is caused to be transmitted from a first transducer element group including a first plurality of transducer elements that are arranged in a first direction along one of two axes intersecting each other and are connected in common to one another,
when a reflected wave of the first ultrasound wave is to be received, the reflected wave of the first ultrasound wave is caused to be received by a second transducer element group including a second plurality of transducer elements that are arranged in a second direction along the other of the two axes and are connected in common to one another,
when a second ultrasound wave is to be transmitted, the second ultrasound wave is caused to be transmitted from the second transducer element group, and
when a reflected wave of the second ultrasound wave is to be received, the reflected wave of the second ultrasound wave is caused to be received by the first transducer element group,
the processing circuitry is further configured to generate the ultrasound image data based on a first reception signal obtained by causing the reflected wave of the first ultrasound wave to be received by the second transducer element group and a second reception signal obtained by causing the reflected wave of the second ultrasound wave to be received by the first transducer element group,
the ultrasound diagnosis apparatus further includes a memory storing therein a trained model configured, in response to receiving an input of a set made up of two or more of the first reception signals delayed and output from two or more of the second transducer element groups and two or more of the second reception signals delayed and output from two or more of the first transducer element groups, to output a signal corresponding to a post-beam-forming signal obtained by performing a beam forming process on reception signals output from a plurality of transducer elements arranged two-dimensionally, and the processing circuitry is further configured to (1) generate the set made up of the two or more delayed first reception signals and the two or more delayed second reception signals, (2) input the generated set to the trained model, (3) obtain the signal corresponding to the post-beam-forming signal output from the trained model, and (4) generate the ultrasound image data based on the obtained signal corresponding to the post-beam-forming signal.

2. The ultrasound diagnosis apparatus according to claim 1, wherein, as the beam forming process, the processing circuitry is further configured to perform a beam forming process by implementing a Minimum Variance (MV) method, an Amplitude and Phase Estimation (APES) method, a Coherence Factor (FC) method, or a Sign Coherence (SCF) method.

\* \* \* \* \*